(12) United States Patent
Mizuno et al.

(10) Patent No.: US 8,169,731 B2
(45) Date of Patent: May 1, 2012

(54) NEAR-FIELD LIGHT TRANSDUCER COMPRISING PROPAGATION EDGE WITH PREDETERMINED CURVATURE RADIUS

(75) Inventors: Tomohito Mizuno, Tokyo (JP); Yoshihiro Tsuchiya, Tokyo (JP); Koji Shimazawa, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 254 days.

(21) Appl. No.: 12/540,752

(22) Filed: Aug. 13, 2009

(65) Prior Publication Data

US 2011/0038236 A1 Feb. 17, 2011

(51) Int. Cl.
*G11B 5/02* (2006.01)
*G11B 11/00* (2006.01)

(52) U.S. Cl. ........................... 360/59; 369/13.24

(58) Field of Classification Search ............... None
See application file for complete search history.

(56) References Cited

U.S. PATENT DOCUMENTS

| | | |
|---|---|---|
| 5,785,897 A | 7/1998 | Toufuku et al. |
| 6,649,849 B2 | 11/2003 | Matsumoto et al. |
| 6,768,556 B1 | 7/2004 | Matsumoto et al. |
| 7,330,404 B2 | 2/2008 | Peng et al. |
| 7,454,095 B2 | 11/2008 | Baehr-Jones et al. |
| 2009/0130365 A1* | 5/2009 | Kojima et al. ............... 428/64.4 |
| 2010/0103553 A1* | 4/2010 | Shimazawa et al. .......... 360/59 |
| 2010/0149930 A1* | 6/2010 | Komura et al. ........... 369/13.33 |

FOREIGN PATENT DOCUMENTS

| | | |
|---|---|---|
| JP | 11-12026 | 1/1999 |
| JP | 2008-111845 | 5/2008 |

OTHER PUBLICATIONS

Michael Hochberg, et al. "Integrated Plasmon and dielectric waveguides" Optics Express, vol. 12, No. 22, Nov. 2004, pp. 5481-5486.
U.S. Appl. No. 12/260,639, filed Oct. 29, 2008 for Koji Shimazawa, et al.

* cited by examiner

*Primary Examiner* — Daniell L Negron
*Assistant Examiner* — Regina N Holder
(74) *Attorney, Agent, or Firm* — Frommer Lawrence & Haug LLP

(57) ABSTRACT

Provided is a near-field light transducer with a propagation edge in which the generation of defects is suppressed. The transducer is formed of a Ag alloy and comprises an edge, the edge comprising a portion to be coupled with a light in a surface plasmon mode, the edge extending from the portion to a near-field light generating end surface, and the edge being configured to propagate surface plasmon excited by the light. Further, a curvature radius of the rounded edge is set in the range from 6.25 nm to 20 nm. In the edge and its vicinity, the generation of defects such as cracking and chipping is suppressed. Thereby improved are a propagation efficiency of surface plasmon and a light use efficiency of the transducer. The Ag alloy preferably contains at least one element selected from a group of Pd, Au, Cu, Ru, Rh and Ir.

12 Claims, 15 Drawing Sheets

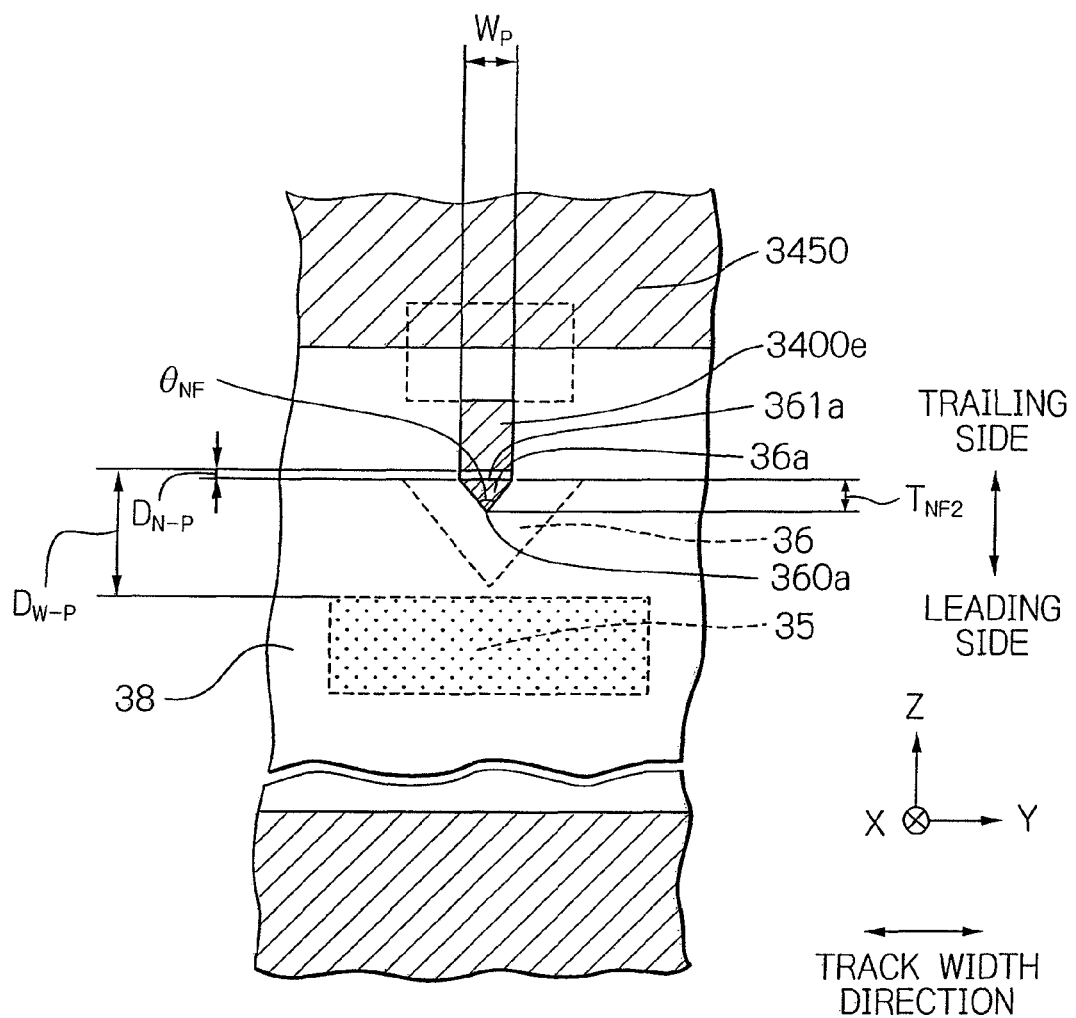

$r_E : 6.25\sim20$nm $r_E : 6.25\sim20$nm

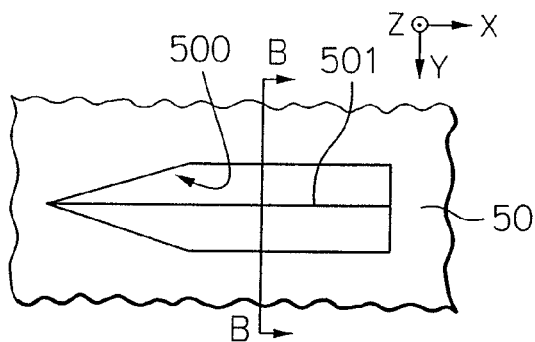
Fig. 7a1
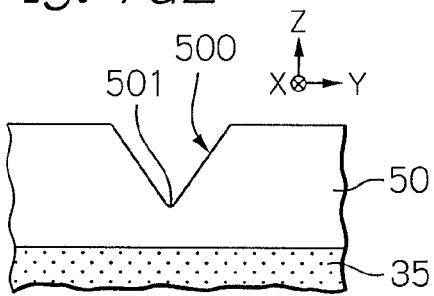
Fig. 7a2
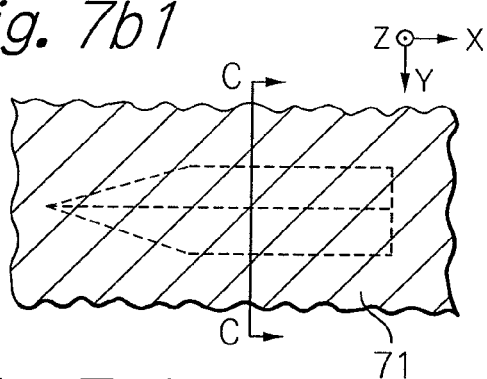
Fig. 7b1
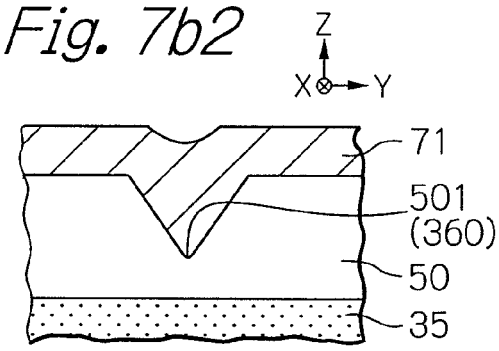
Fig. 7b2
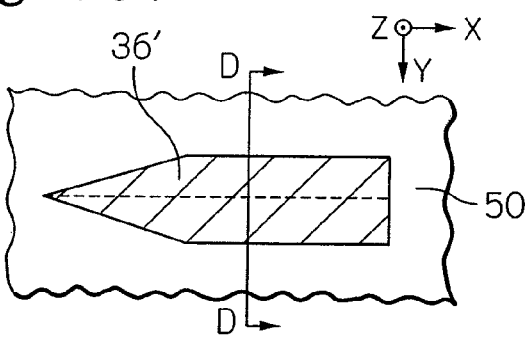
Fig. 7c1
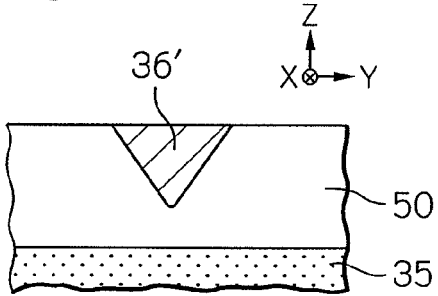
Fig. 7c2
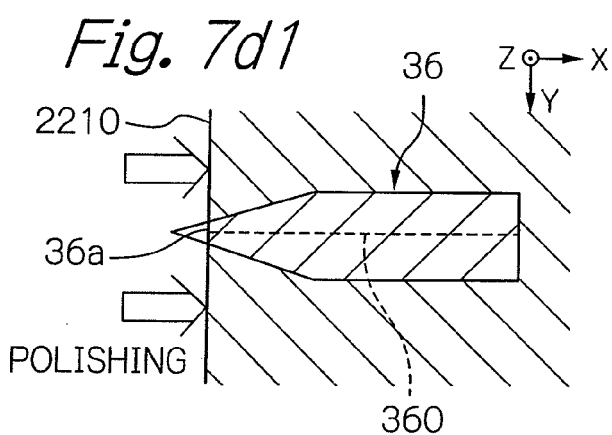
Fig. 7d1
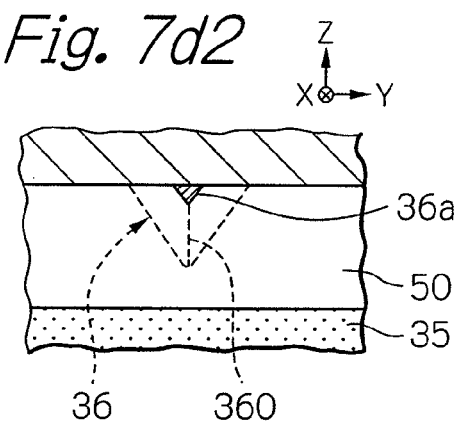
Fig. 7d2

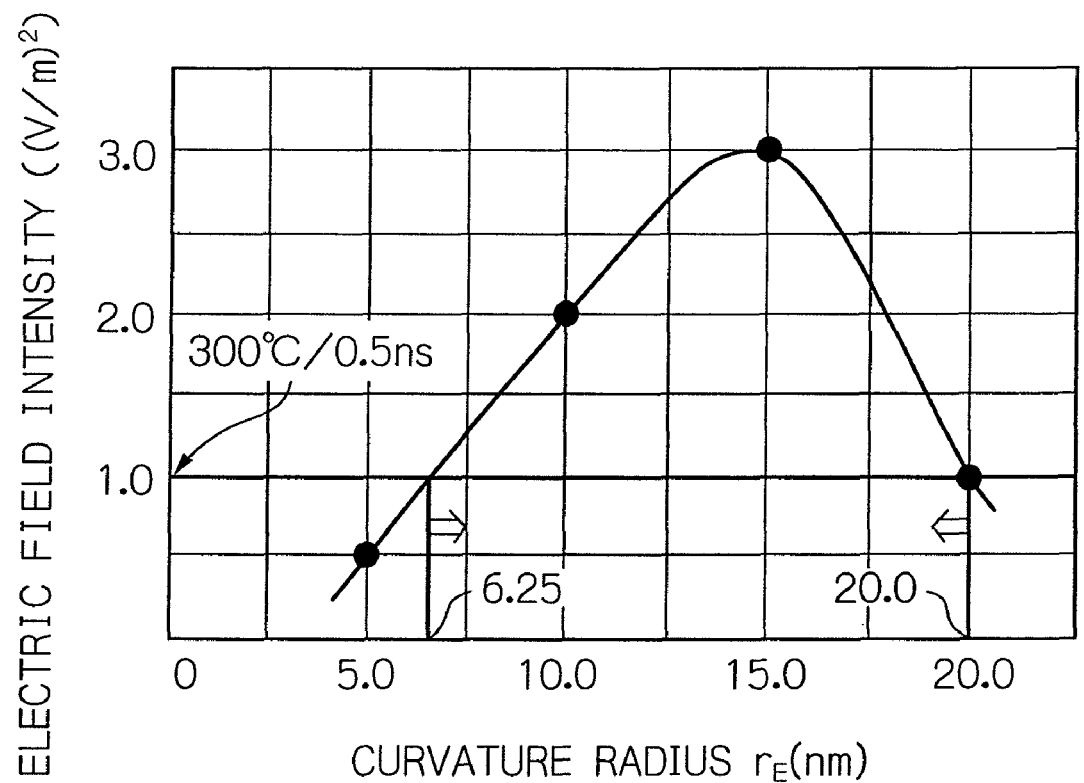

NEAR-FIELD LIGHT TRANSDUCER COMPRISING PROPAGATION EDGE WITH PREDETERMINED CURVATURE RADIUS

BACKGROUND OF THE INVENTION

1. Field of the Invention

The present invention relates to a near-field light (NF-light) transducer for generating NF-light by being irradiated with light. And the present invention relates to a head used for a thermally-assisted magnetic recording in which a magnetic recording medium is irradiated with NF-light, thereby anisotropic magnetic field of the medium is lowered, thus data can be written. Further, the present invention relates to a magnetic recording apparatus provided with the head.

2. Description of the Related Art

As the recording densities of magnetic recording apparatuses become higher, as represented by magnetic disk apparatuses, further improvement has been required in the performance of thin-film magnetic heads and magnetic recording media. Especially, in the magnetic recording media, it is necessary to decrease the size of magnetic grains that constitute a magnetic recording layer of the medium and to reduce irregularity in the boundary of record bit in order to improve the recording density. However, the decrease in size of the magnetic grains raises a problem of degradation in thermal stability of the magnetization due to the decrease in volume. As a measure against the thermal stability problem, it may be possible to increase magnetic anisotropy energy $K_U$ of the magnetic grains. However, the increase in energy $K_U$ causes the increase in anisotropic magnetic field (coercive force) of the magnetic recording medium. As a result, the head cannot write data to the magnetic recording medium when the anisotropic magnetic field (coercive force) of the medium exceeds the write field limit.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write field to the heated portion.

A technique is well known, in which the heating of a portion to be written of the medium is performed by irradiating the portion with near-field light (NF-light). For example, U.S. Pat. No. 6,768,556 and U.S. Pat. No. 6,649,894 disclose a technique in which a NF-light transducer, that is a metal plate for generating NF-light, so-called a plasmon antenna, is provided on the opposed-to-medium surface. Then, NF-light is generated by irradiating one side of the plasmon antenna with laser light guided through a waveguide, the one side being opposite to the opposed-to-medium surface.

On the other hand, the present inventors have devised a NF-light transducer in which laser light propagating through a waveguide is coupled with a plasmon antenna in a surface plasmon mode to cause excited surface plasmon to propagate to the opposed-to-medium surface, thereby providing NF-light, instead of directly applying the laser light to the plasmon antenna. The NF-light transducer has a propagation edge that reaches the opposed-to-medium surface, and the excited surface plasmon propagates on the propagation edge. The NF-light transducer is hereinafter referred to as a surface plasmon antenna. In the surface plasmon antenna, its temperature does not excessively rise because laser light is not directly applied to the surface plasmon antenna. As a result, there can be avoided a situation in which the end of a read head element, which reaches the opposed-to-medium surface, becomes relatively far apart from the magnetic recording medium due to the thermal expansion of the plasmon antenna, which makes it difficult to properly read servo signals during recording operations. In addition, there can also be avoided a situation in which the light use efficiency of the NF-light transducer is degraded because thermal fluctuation of free electrons increases in the plasmon antenna. Actually, there can be achieved approximately 20% which is the same as or more than the light use efficiency of conventional plasmon antennas. Here, the light use efficiency of a NF-light transducer is given by $I_{OUT}/I_{IN}(\times 100)$, where $I_{IN}$ is the intensity of laser light incident to the waveguide, and $I_{OUT}$ is the intensity of NF-light emitted from a near-field-light-generating (NFL-generating) end of the surface plasmon antenna after converting the laser light into surface plasmon in the surface plasmon antenna.

The propagation edge of the surface plasmon antenna is very sharp; the condition of the propagation edge, in particular, the curvature radius of the edge has been understood to have an influence on the intensity of generated NF-light. Therefore, the condition of the edge is required to be appropriately adjusted in order to obtain a sufficient intensity of NF-light. Further, metal material which forms the surface plasmon antenna is required to have a structure with minute crystal grains so as to shape a desired sharp edge without any defects.

Silver (Ag), which is currently considered to have the highest efficiency of generating NF-light, typically has a structure of crystal grains with a variety of radii (halves of grain diameters) in the range from 20 to 50 nm (nanometers). When the Ag is used as the constituent material of the surface plasmon antenna in its formation process, there may especially occur defects in the vicinity of the propagation edge. This can cause the manufacturing process yield to be lowered. Actually, in the forming process of the surface plasmon antenna, first the whole body including the propagation edge is shaped; then, an end surface from which NF-light is generated is formed by a polishing process that determines the opposed-to-medium surface. Therefore, depending on the constituent metal material of the surface plasmon antenna, the polishing may cause some of crystal grains that constitute the propagation edge to be damaged or to drop off, thereby bringing about defects such as cracking and chipping in the vicinity of the propagation edge.

As described above, it is crucial that the surface plasmon antenna has a propagation edge in which the condition of the edge is appropriately controlled and the generation of defects such as cracking and chipping is suppressed.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, each of an "upper surface" and a "lower surface" is one of the "side surfaces". The "side surface" is a surface on which the propagating light can be totally reflected within the waveguide that corresponds to a core.

According to the present invention, a near-field light (NF-light) transducer is provided, which is formed of a silver (Ag) alloy and comprises an edge. The edge comprises a portion to be coupled with a light in a surface plasmon mode, the edge extending from the portion to a near-field-light-generating (NFL-generating) end surface from which NF-light is emitted, and the edge being configured to propagate surface plasmon excited by the light. Further, a curvature radius of the edge that is rounded is set to be 6.25 nm (nanometers) or more and being 20 nm or less.

This NF-light transducer is formed of a Ag alloy, and its edge is appropriately controlled to have a curvature radius in a predetermined range. As a result, a sufficient intensity of NF-light can be emitted from the transducer. Further, the generation of defects such as cracking and chipping is suppressed in the edge and its vicinity. Thereby improved are a propagation efficiency of surface plasmon that propagates on the edge and further a light use efficiency of the NF-light transducer.

In the NF-light transducer according to the present invention, the Ag alloy preferably contains at least one element selected from a group of palladium (Pd), gold (Au), copper (Cu), ruthenium (Ru), rhodium (Rh) and iridium (Ir). Further, it is more preferable that the Ag alloy is a Ag—Pd alloy, the concentration of Pd being 0.1 at % (atomic percent) or more, and being 7.5 at % or less. Further, it is also more preferable that the Ag alloy is a Ag—Au alloy, the concentration of Au being 0.1 at % or more, and being 5 at % or less. Further, it is also more preferable that the Ag alloy is a Ag—Cu alloy, the concentration of Cu being 0.15 at % or more, and being 8 at % or less. Further, it is also more preferable that the Ag alloy is a Ag—Ru alloy, the concentration of Ru being 0.15 at % or more, and being 5 at % or less. Further, it is also more preferable that the Ag alloy is a Ag—Rh alloy, the concentration of Rh being 0.2 at % or more, and being 5.5 at % or less. Further, it is also more preferable that the Ag alloy is a Ag—Ir alloy, the concentration of Ir being 0.2 at % or more, and being 8 at % or less. The Ag alloys with the above-described additive concentrations are controlled to have radii of crystal grains (a half of grain diameter) in the range of 20 nm or less.

The NF-light transducer formed of the Ag alloys with the special compositions have a excellently high abrasion-proof characteristic during manufacturing, and shows the second highest light use efficiency next to that in case of Ag. Further, in the edge and its vicinity of the transducer, the generation of defects such as cracking and chipping is suppressed. Here, the NFL-generating end surface is preferably a polished surface formed by a polishing.

According to the present invention, a NFL-generating optical system is further provided, which comprises a waveguide configured to propagate the light for exciting surface plasmon and the above-described NF-light transducer. In the NFL-generating optical system, it is preferable that further provided is a buffering portion that is sandwiched between a portion of one side surface of the waveguide and a portion of the edge and has a refractive index lower than a refractive index of the waveguide.

According to the present invention, a thermally-assisted magnetic recording head is further provided, which comprises: a magnetic pole for generating write field from its end on an opposed-to-medium surface side; a waveguide configured to propagate a light for exciting surface plasmon; and the above-described NF-light transducer. This head includes the above-described transducer in which a propagation efficiency of surface plasmon that propagates on the edge and a light use efficiency are improved. As a result, by using the head, a satisfactory thermally-assisted magnetic recording can be performed, in which an intended position to be written is sufficiently heated and thus write operations are reliably conducted.

In the above-described thermally-assisted magnetic recording head, the waveguide is preferably provided on a side opposite to the magnetic pole in relation to the NF-light transducer. And it is preferable that further provided is a buffering portion that is sandwiched between a portion of one side surface of the waveguide and a portion of the edge and has a refractive index lower than a refractive index of the waveguide. Further, the NFL-generating end surface is preferably a portion of the opposed-to-medium surface formed by a polishing. Furthermore, it is also preferable that a light source is provided on a side of the head opposite to the opposed-to-medium surface, and an end surface of the waveguide on a light-receiving side reaches a head end surface on an opposite side to the opposed-to-medium surface and is positioned in such a way as to receive a light generated from the light source.

According to the present invention, a head gimbal assembly (HGA) is further provided, which comprises the above-described thermally-assisted magnetic recording head and a suspension supporting the thermally-assisted magnetic recording head. According to the present invention, a magnetic recording apparatus is further provided, which comprises: the HGA; at least one magnetic recording medium; and a recording circuit for controlling write operations which the thermally-assisted magnetic recording head performs to the at least one magnetic recording medium, the recording circuit further comprising a light-emission control circuit for controlling operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements is arbitrary for viewability.

BRIEF DESCRIPTION OF THE DRAWINGS

FIG. 5 shows a perspective view illustrating the shapes of the end surfaces of the waveguide, the surface plasmon antenna and the electromagnetic transducer on the head part end surface or in its vicinity;

FIGS. 7a1 to 7d2 show top views and cross-sectional views illustrating one embodiment of the method for forming the surface plasmon antenna according to the present invention;

FIG. 8 shows a graph illustrating the relation between the curvature radius $r_E$ of the propagation edge and the intensity of electric field of the NF-light with which the magnetic recording layer is irradiated;

FIG. 9b shows a graph illustrating the relation between the additive concentration of Pd or Au and the percent defective of cracking or chipping, in the surface plasmon antenna used in the practical examples shown in FIG. 9a;

FIG. 11b shows a graph illustrating the relation between the additive concentration of Cu or Ru and the percent defective of cracking or chipping, in the surface plasmon antenna used in the practical examples shown in FIG. 11a;

FIG. 13b shows a graph illustrating the relation between the additive concentration of Rh or Ir and the percent defective of cracking or chipping, in the surface plasmon antenna used in the practical examples shown in FIG. 13a.

DESCRIPTION OF THE PREFERRED EMBODIMENTS

Figure 1:
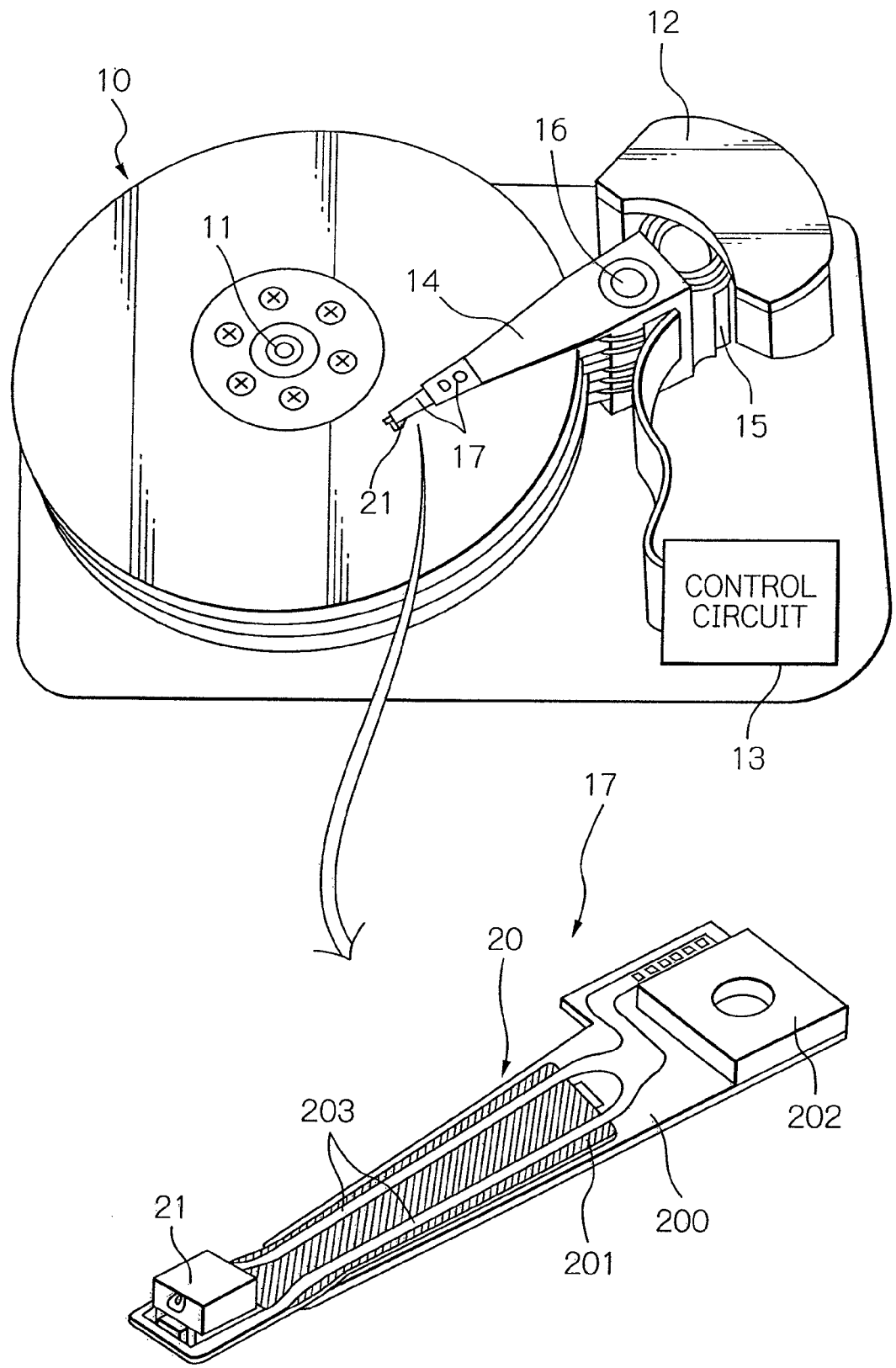
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later.

In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be singular.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
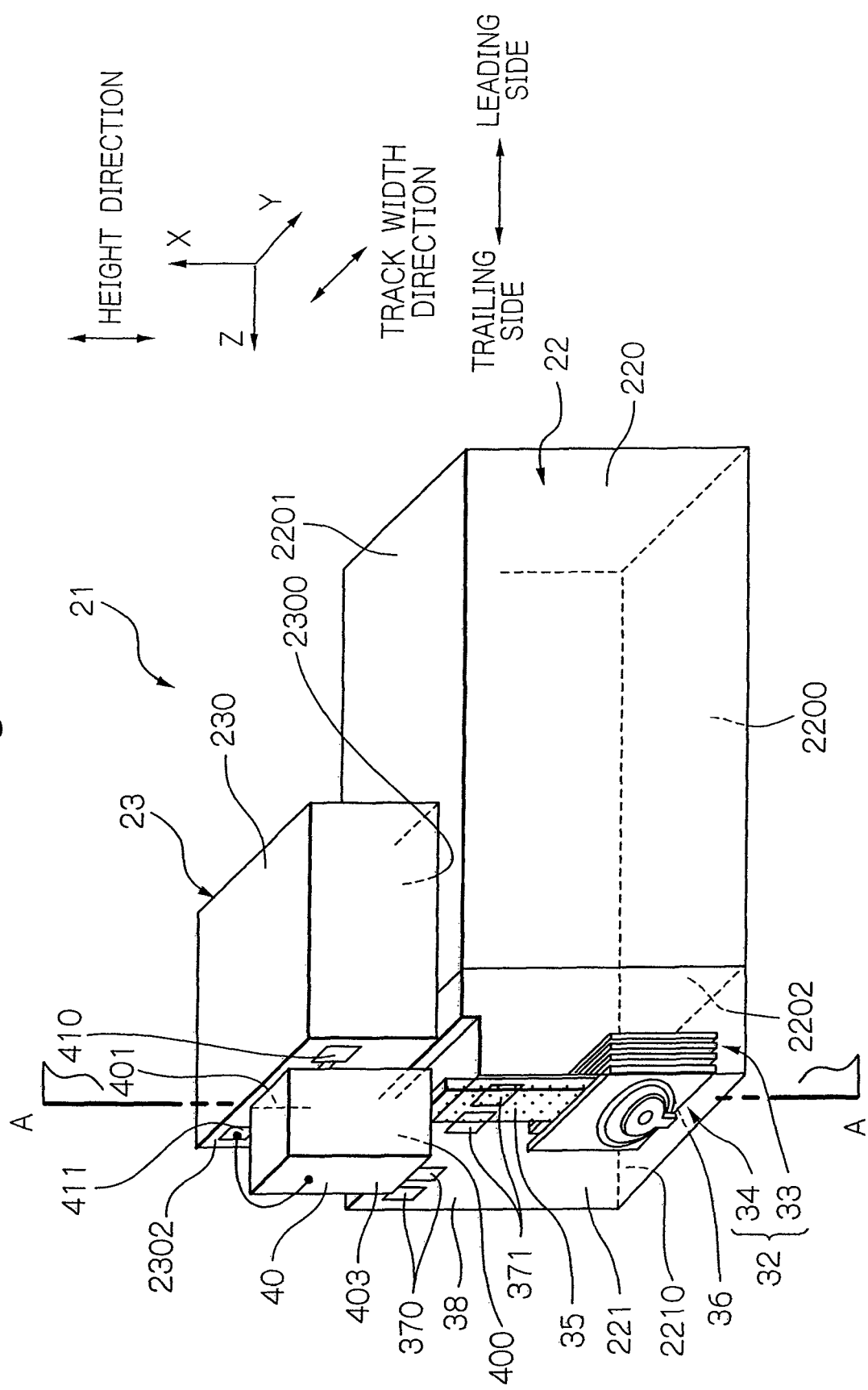
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of the slider 22 and the light source unit 23. The slider 22 includes: a slider substrate 220 formed of, for example, AlTiC ($Al_2O_3$—TiC), and having an air bearing surface (ABS) 2200 processed so as to provide an appropriate flying height; and a head part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon antenna 36, the antenna 36 and the waveguide 35 constituting a near-field-light-generating (NFL-generating) system; an overcoat layer 38 formed on the element-formation surface 2202 in such a way as to cover the MR element 33, the electromagnetic transducer 34, the waveguide 35, and the surface plasmon antenna 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34, and the surface plasmon antenna 36 reach the head part end surface 2210, which is an opposed-to-medium surface of the head part 221. Here, the head part end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the surface plasmon antenna 36 in a surface plasmon mode, and causes surface plasmon to be excited on the surface plasmon antenna 36. The surface plasmon propagates on a propagation edge provided in the surface plasmon antenna 36, which will be explained later, toward the head part end surface 2210, which causes near-field light (NF-light) to be generated from the end of the surface plasmon antenna 36 on the head part end surface 2210 side. The generated NF-light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
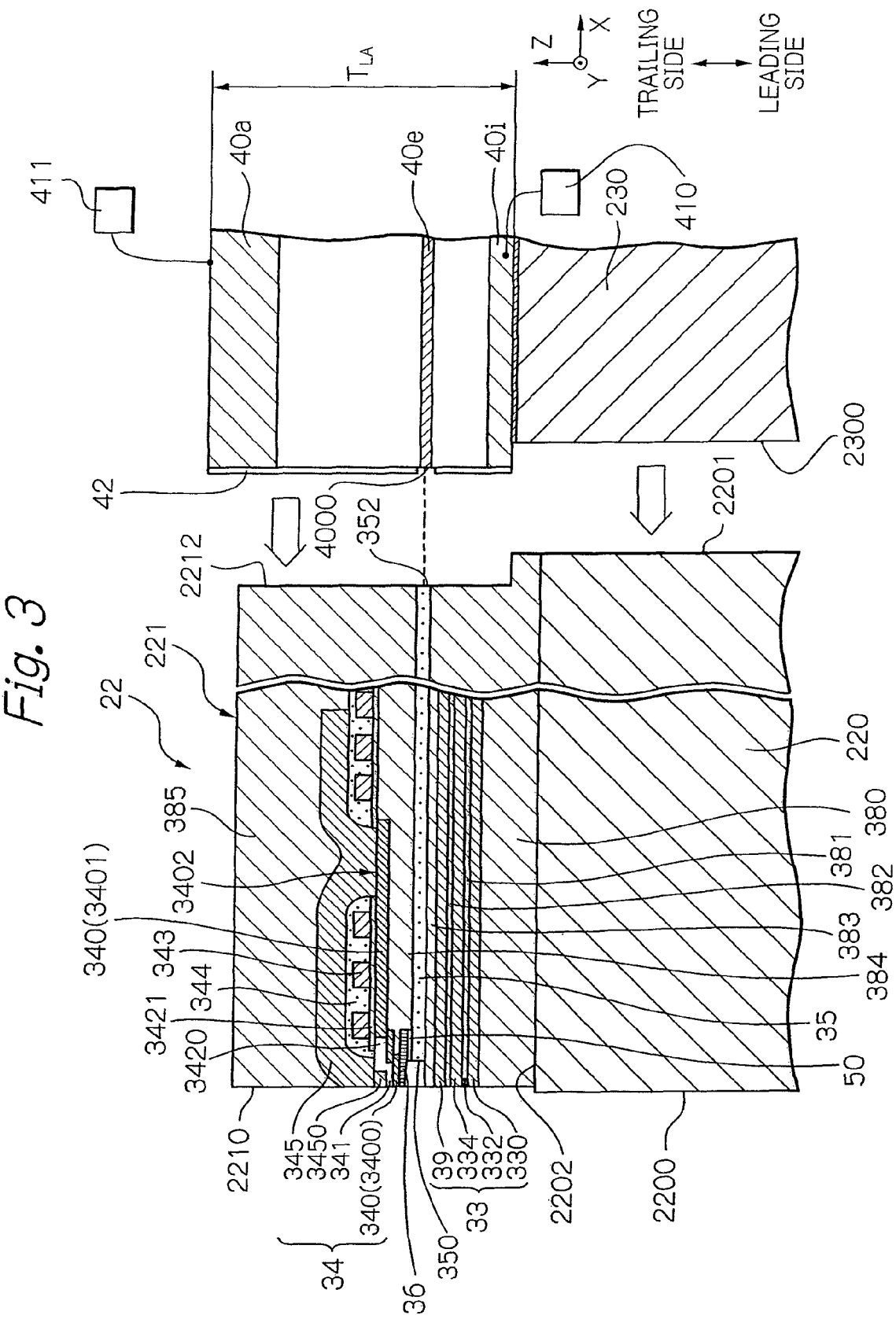
FIG. 3 shows a cross-sectional view taken by plane A in FIG. 2, schematically illustrating a main part of the thermally-assisted magnetic recording head according to the present invention.

FIG. 3 shows a cross-sectional view taken by plane A in FIG. 2, schematically illustrating a main part of the thermally-assisted magnetic recording head 21.

As shown in FIG. 3, the MR element 33 is formed on the insulating layer 380 stacked on the element-formation surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using an MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Also as shown in FIG. 3, the electromagnetic transducer 34 is designed for perpendicular magnetic recording in the present embodiment, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic recording layer (perpendicular magnetization layer) of the magnetic disk, the magnetic flux being excited by write current flowing through the write coil layer 343. The main magnetic pole layer 340 has a structure in which a main magnetic pole 3400 and a main pole body 3401 are sequentially stacked. The main magnetic pole 3400 includes: a first main pole portion 3400a (FIG. 4) having a small width $W_P$ (FIG. 5) in the track width direction and reaching the head part end surface 2210; and a second main pole portion 3400b (FIG. 4) located on the first main pole portion 3400a and at the rear (+X side) of the portion 3400a. The small width $W_P$ of the first main pole portion 3400a enables a fine write magnetic field to be generated, so that the track width can be set to be a much small value adequate for higher recording density. The main magnetic pole 3400 is formed of a soft-magnetic material with a saturation magnetic flux density higher than that of the main pole body 3401, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm (micrometer).

The gap layer 341 forms a gap provided for separating the main magnetic pole layer 340 from the write shield layer 345 in the region near the head part end surface. The gap layer 341 can be formed, for example, of a non-magnetic insulating material such as $Al_2O_3$ (alumina), $SiO_2$ (silicon dioxide), AlN (aluminum nitride) or DLC, or can be formed of a non-magnetic conductive material such as Ru (ruthenium). The thickness of the gap layer 341 determines the distance between the main magnetic pole layer 340 and the write shield layer 345, and is, for example, in the range of approximately 0.01 to 0.5 μm. The write coil layer 343 is formed on an insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of, for example, a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment, however, may have a two or more layered structure or a helical coil shape. Further, the number of turns of the write coil layer 343 is not limited to that shown in FIG. 3, and may be, for example, in the range from 2 to 7 turns.

The write shield layer 345 reaches the head part end surface 2210, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 μm. Further, the write shield layer 345 has a trailing shield 3450 that is a portion opposed to the main magnetic pole layer 340. The trailing shield 3450 also extends to the head part end surface 2210, and is provided for receiving the magnetic flux spreading from the main magnetic pole layer 340. In the present embodiment, the trailing shield 3450 has a width in the track width direction larger than the width of the main pole body 3401 as well as than the first main pole portion 3400a. This trailing shield 3450 causes the magnetic field gradient between the end portion of the trailing shield 3450 and the first main pole portion 3400a to become steeper. As a result, a jitter of signal output becomes smaller, and therefore, error rates during read operations can be reduced. The write shield layer 345 is formed of a soft-magnetic material; especially, the trailing shield 3450 can be formed of a material with a high saturation magnetic flux density such as NiFe (Permalloy) or formed of an iron alloy that the main magnetic pole 3400 is formed of.

Referring also to FIG. 3, the waveguide 35 and the surface plasmon antenna 36 are provided between the MR element 33 and the electromagnetic transducer 34, and constitute an optical system of the head part 221 for generating NF-light. Here, the waveguide 35 is arranged in parallel with the element-formation surface 2202, and extends from an rear-end surface 352 that is a part of the head part rear-end surface 2212 to an end surface 350 disposed on the head part end surface 2210 side. Further, a portion of the upper surface (side surface) of the waveguide 35 and a portion of the lower surface (including a propagation edge 360 (FIG. 4)) of the surface plasmon antenna 36 are opposed to each other with a predetermined distance. The portion sandwiched therebetween is a buffering portion 50 having a refractive index lower than that of the waveguide 35. The buffering portion 50 acts for coupling the laser light, which propagates through the waveguide 35, with the surface plasmon antenna 36 in a surface plasmon mode. Here, the buffering portion 50 may be a portion of an insulating layer 384 that is a part of the overcoat layer 38, or may be a new layer provided other than the insulating layer 384.

In the above-described NFL-generating optical system according to the present invention, the surface plasmon antenna 36 is formed of an alloy with silver (Ag) as a main component. Further, the curvature radius of the rounded edge of the propagation edge 360 (FIG. 4) is set to be 6.25 nm (nanometers) or more and to be 20 nm or less: thus the condition of the edge is appropriately controlled. As a result, there can be realized a propagation edge 360 in which the generation of defects such as cracking and chipping is sufficiently suppressed. Thereby improved are a propagation efficiency of surface plasmon that propagates on the propagation edge 360 and further a light use efficiency of the surface plasmon antenna 36. Furthermore, the crystal structure of the above-described surface plasmon antenna 36 contributes to the improvement of process yield in head manufacturing. A detailed explanation of the waveguide 35, the surface plasmon antenna 36, and the buffering portion 50 will be given later with reference to FIG. 4.

Further, as is in the present embodiment, an inter-element shield layer 39 is preferably provided between the MR element 33 and the electromagnetic transducer 34 (waveguide 35), sandwiched by the insulating layers 382 and 383. The inter-element shield layer 39 may be formed of a soft-magnetic material, and plays a role for shielding the MR element 33 from magnetic field generated from the electromagnetic transducer 34. Further, a backing coil portion may be provided between the inter-element shield layer 39 and the waveguide 35, though not shown in the figure, in order to suppress wide adjacent track erasure (WATE).

Also according to FIG. 3, the light source unit 23 includes: a unit substrate 230; a laser diode 40 provided on the source-installation surface 2302 of the unit substrate 230; a terminal electrode 410 electrically connected to the lower surface 401 as an electrode of the laser diode 40; and a terminal electrode 411 electrically connected to the upper surface 403 as an electrode of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon antenna 36 through the buffering portion 50 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm to 1.7 μm (micrometer). Specifically, for example, a laser diode of InGaAsP/InP quaternary mixed crystal can also be used, in which possible wavelength region is set to be from 1.2 to 1.67 μm. The laser diode 40 has a multilayered structure including an upper-electrode 40a, an active layer 40e, and a lower-electrode 40i. On the front and rear cleaved surfaces of the multilayered structure of the laser diode 40, respectively formed are reflective layers for exciting the oscillation by total reflection. Further, the reflective layer 42 has an opening in the position of the active layer 40e including the light-emission center 4000. Here, the laser diode 40 has a thickness $T_{LA}$ of, for example, approximately 60 to 200 μm.

Further, an electric source provided within the magnetic disk apparatus can be used for driving the laser diode 40. In fact, the magnetic disk apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk apparatus. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, for example, in which the width in the track width direction is 425 μm; the length is 300 μm; and the thickness is 300 μm.

By joining the above-described slider 22 and light source unit 23, constituted is the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 opposite to the ABS 2200 of the waveguide 35.

Figure 4:
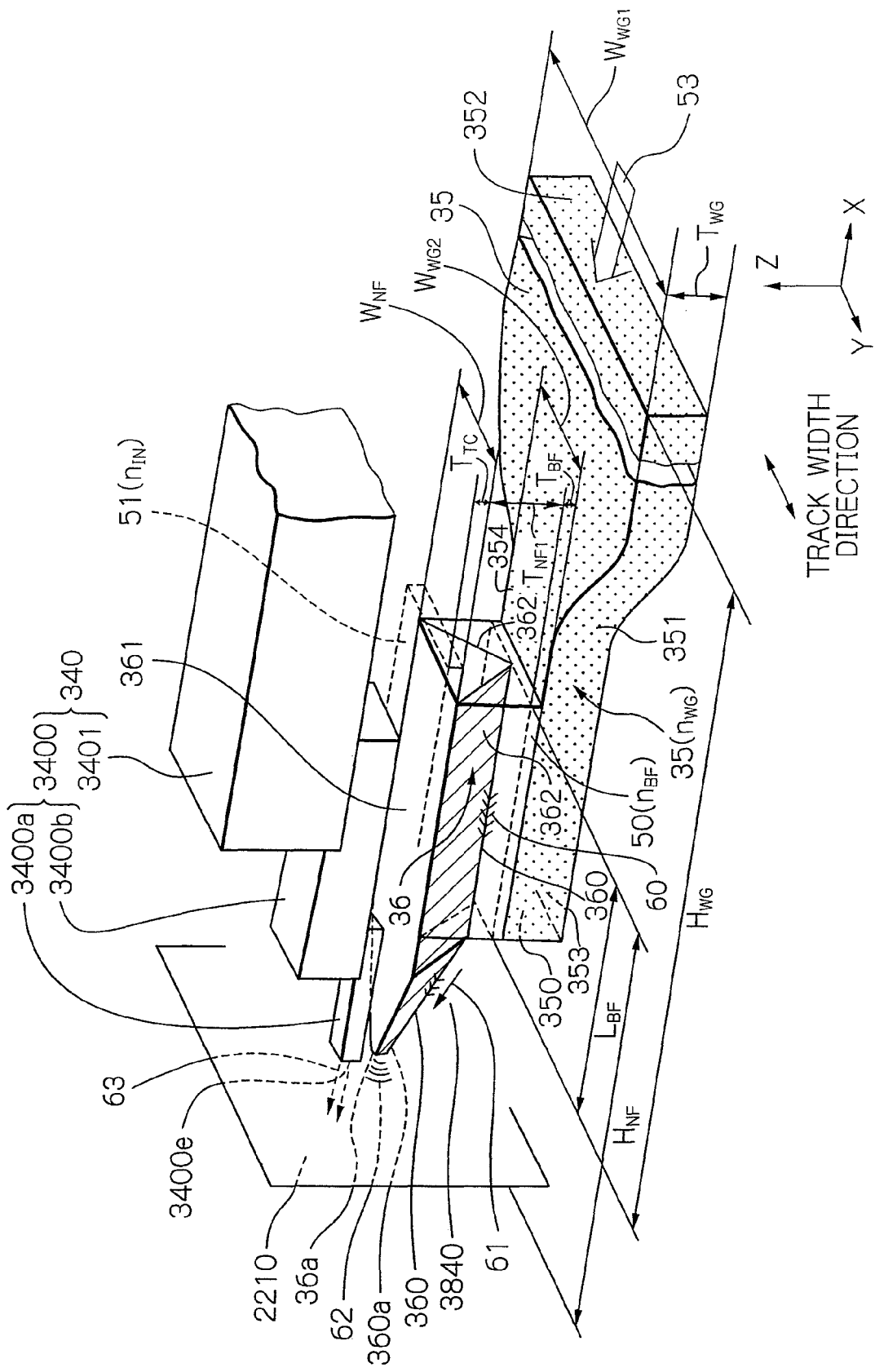
FIG. 4 shows a perspective view schematically illustrating the configuration of the waveguide, the surface plasmon antenna and the main magnetic pole layer.

FIG. 4 shows a perspective view schematically illustrating the configuration of the waveguide 35, the surface plasmon antenna 36 and the main magnetic pole layer 340. In the figure, the head part end surface 2210 is positioned at the left side, the end surface 2210 including positions where write field and NF-light are emitted toward the magnetic recording medium.

Referring to FIG. 4, the configuration includes: the waveguide 35 for propagating laser light 53 used for generating NF-light; and the surface plasmon antenna 36 that has a propagation edge 360 as an edge on which surface plasmon excited by the laser light (waveguide light) 53 propagates. The surface plasmon antenna 36 further has a NFL-generating end surface 36a reaching the head part end surface 2210. Further, a buffering portion 50 is provided as a portion sandwiched between a portion of the side surface 354 of the waveguide 35 and the lower surface 362 including a propagation edge 360 of the surface plasmon antenna 36. That is, the propagation edge 360 is covered with the buffering portion 50. The buffering portion 50 acts for coupling the waveguide light 53 with the surface plasmon antenna 36 in a surface plasmon mode. And the propagation edge 360 plays a role of propagating surface plasmon excited by the waveguide light 53 to the NFL-generating end surface 36a. Here, side surfaces of the waveguide 35 indicate, out of end surfaces surrounding the waveguide 35, end surfaces other than the end surface 350 on the head part end surface 2210 side and the rear-end surface 352 on the opposite side. The side surface serves as a surface on which the propagating waveguide light 53 can be totally reflected in the waveguide 35 that acts as a core. In the present embodiment, the side surface 354 of the waveguide 35, a portion of which is in surface contact with the buffering potion 50, is the upper surface of the waveguide 35. The buffering portion 50 may be a portion of the overcoat layer 38 (FIG. 2) or a new layer provided other than the overcoat layer 38.

Specifically, the waveguide light 53, which has advanced to near the buffering portion 50, couples with the optical configuration including the waveguide 35 with a refractive index $n_{WG}$, the buffering portion 50 with a refractive index $n_{BF}$ and the surface plasmon antenna 36 made of a Ag alloy, and induces a surface plasmon mode on the propagation edge 360 of the surface plasmon antenna 36. That is, the waveguide light 53 couples with the surface plasmon antenna 36 in a surface plasmon mode. This surface plasmon mode can be induced by setting the refractive index $n_{BF}$ of the buffering portion 50 to be lower than the refractive index $n_{WG}$ of the waveguide 35 ($n_{BF}<n_{WG}$). Actually, evanescent light is excited within the buffering portion 50 based on an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode, and thus surface plasmon 60 is excited. To be exact, there excited is surface plasmon polariton in this system because surface plasmon as an elementary excitation is coupled with an electromagnetic wave. However, the surface plasmon polariton will be hereinafter referred to as surface plasmon for short. The propagation edge 360 is located closest to the waveguide 35 on the inclined lower surface 362 of the surface plasmon antenna 36, and is just an edge where electric field tends to converge and thus surface plasmon can easily be excited.

Further, the NFL-generating end surface 36a of the surface plasmon antenna 36 is close to an end surface 3400e of the main magnetic pole 3400, the end surface 3400e reaching the head part end surface 2210. Moreover, the propagation edge 360 extends to the NFL-generating end surface 36a. Further, a portion of the propagation edge 360 on the end surface 36a side (end surface 2210 side) has a shape of line or curve extending toward the NFL-generating end surface 36a in such a way as to become closer to the end surface 361 on the side opposite to the propagation edge 360 of the plasmon antenna 36. The surface plasmon 60 excited on the propagation edge 360 propagates on the edge 360 along the direction shown by arrow 61. The propagation of the surface plasmon 60 can occur under the condition that the propagation edge 360 is covered with the buffering portion 50 having a refractive index $n_{BF}$ equal to or higher than a refractive index $n_{IN}$ of the material that covers the end surface 361 of the surface plasmon antenna 36 on the side opposite to the edge 360.

The propagation edge 360 is made rounded to prevent surface plasmon 60 from running off from the edge 360 and thus to avoid the decrease in light use efficiency. The curvature radius of the rounded edge is set to be in the range of 6.25 to 20 nm, thus the condition of the edge is appropriately controlled. As a result, as will be explained later with reference to practical examples, a NF-light 62 with a sufficient intensity of electric field for realizing a favorable thermally-assisted magnetic recording can be generated from the NFL-generating end surface 36a.

As also shown in FIG. 4, in the present embodiment, the surface plasmon antenna 36 tapers toward the NFL-generating end surface 36a in the height direction (Z-axis direction) near the head part end surface 2210. And the surface plasmon antenna 36 has a cross-section taken by YZ plane with a triangular shape, and especially has a predetermined triangular shape in the vicinity of the head part end surface 2210. As a result, in the present embodiment, the NFL-generating end surface 36a has a triangular shape (FIG. 5) in which one apex is the end of the propagation edge 360. Here, surface plasmon 60 propagating on the propagation edge 360 reaches the NFL-generating end surface 36a including the apex 360a that is the destination of the propagation edge 360. Therefore, the surface plasmon 60, namely, electric field converges on the NFL-generating end surface 36a. As a result, NF-light 62 is generated from the NFL-generating end surface 36a. Then, the NF-light 62 is emitted toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion. Thus, a thermally-assisted magnetic recording can be achieved.

The surface plasmon antenna 36 is formed of an alloy with silver (Ag) as a main component. The alloy preferably contains at least one element selected from a group of palladium (Pd), gold (Au), copper (Cu), ruthenium (Ru), rhodium (Rh) and iridium (Ir). Further, the Ag alloy is more preferably a Ag—Pd alloy with Pd concentration of 0.1 to 7.5 at % (atomic percent), a Ag—Au alloy with Au concentration of 0.1 to 5 at %, a Ag—Cu alloy with Cu concentration of 0.15 to 8 at %, a Ag—Ru alloy with Ru concentration of 0.15 to 5 at %, a Ag—Rh alloy with Rh concentration of 0.2 to 5.5 at %, or a Ag—Ir alloy with Ir concentration of 0.2 to 8 at %. The surface plasmon antenna 36 formed of the above-described Ag alloy can achieve a high efficiency of generating NF-light, which is the highest efficiency next to that for the case of Ag, as will be explained later with reference to practical examples. Here, Ag theoretically leads to the highest efficiency of generating NF-light. Then, each of the Ag alloys with the above-described concentrations of added elements leads to an efficiency of generating NF-light, which is the same as or higher than that for the case of Au, as will be also explained later with reference to practical examples. Here, Au theoretically leads to the second highest efficiency of generating NF-light in a single element. Furthermore, The surface plasmon antenna 36 formed of the above-described Ag alloy can possess a propagation edge 360 with a desired curvature radius, in which the generation of defects such as cracking and chipping is sufficiently suppressed. Thus, there are improved a propagation efficiency of surface plasmon propagating on the propagation edge 360, and further a light use efficiency of the surface plasmon antenna 36. Moreover, the crystal structure of the above-described surface plasmon antenna 36 contributes to the improvement of process yield in head manufacturing.

Whereas, in a conventional case in which a plasmon antenna provided on the end surface of a head is directly irradiated with laser light propagating through a waveguide, most of the irradiating laser light has been converted into thermal energy within the plasmon antenna. In this case, the size of the plasmon antenna has been set smaller than the wavelength of the laser light, and its volume is very small. Therefore, the plasmon antenna has been brought to a very high temperature, for example, 500° C. (degrees Celsius) due to the thermal energy. As a result, the end of a read head element, which reaches the opposed-to-medium surface, becomes relatively far apart from the magnetic recording medium due to the thermal expansion of the plasmon antenna, which has made it difficult to properly read servo signals during recording operations. Further, the light use efficiency of the plasmon antenna has been degraded because thermal fluctuation of free electrons increases in the plasmon antenna. Here, as a countermeasure, it could be considered that the read head element is also protruded by the heat generated from a heater provided in the head as compensation for the protrusion of the plasmon antenna. However, the response time for the thermal protrusion of plasmon antenna by receiving laser light has an order of, for example, 10 μs (microseconds), whereas the response time for the thermal protrusion by the heat generated from the heater has an order of, for example, 100 μs. Therefore, the compensation with use of the heater has been difficult to accomplish for the reason of its slow response.

On the contrary, in the thermally-assisted magnetic recording according to the present invention, the surface plasmon mode is utilized, and the NF-light 62 is generated by propagating the surface plasmon 60 toward the head part end surface 2210. This brings the temperature at the NFL-generating end surface 36a to, for example, about 100° C. during the emission of NF-light, which is greatly reduced compared to the conventional. As a result, this reduction of temperature allows the protrusion of the NFL-generating end surface 36a toward the magnetic disk 10 to be suppressed; thereby a favorable thermally-assisted magnetic recording can be achieved.

Furthermore, the length $L_{BF}$ of the whole buffering portion 50, that is, of the portion through which the waveguide 35 and the surface plasmon antenna 36 are coupled with each other in a surface plasmon mode, is preferably larger than the wavelength $\lambda_L$ of the laser light 53. In this preferable case, the coupled portion has an area markedly larger than a so-called "focal region" in the case that, for example, laser light is converged on a buffering portion 50 and a surface plasmon antenna 36 and is coupled in a surface plasmon mode. Therefore, the configuration quite different from the system including such "focal region" can be realized in the present invention. As a result, very stable coupling in the surface plasmon mode can be achieved. For reference, the induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

Also according to FIG. 4, the waveguide 35 and the buffering portion 50 are provided on −Z direction side, that is, on the side opposite to the main magnetic pole 3400 in relation to the surface plasmon antenna 36. As a result, the propagation edge 360 is also positioned on the side opposite to the main magnetic pole 3400 in the surface plasmon antenna 36. With such a configuration, even when a distance between the end surface 3400e for generating write field of the main magnetic pole 3400 and the NFL-generating end surface 36a for emitting NF-light is sufficiently small, preferably 100 nm or less, the waveguide 35 can be sufficiently separated apart from the main magnetic pole 3400 and the main pole body 3401. As a result, there can be avoided such a situation in which a part of the waveguide light 53 is absorbed into the main magnetic pole 3400 or main pole body 3401 made of metal and the amount of light to be converted into the NF-light is reduced.

The waveguide 35 may have a shape with a constant width in the track width direction (Y-axis direction), or as shown in FIG. 4, may have a portion on the head part end surface 2210 side, which has a narrower width in the track width direction (Y-axis direction). The width $W_{WG1}$ in the track width direction (Y-axis direction) of a portion of the waveguide 35 on the rear-end surface 352 side may be, for example, in the range approximately from 0.5 to 200 μm, the rear-end surface 352 being opposite to the head part end surface 2210 in the waveguide 35. The width $W_{WG2}$ in the track width direction (Y-axis direction) of a portion of the waveguide 35 on the end surface 350 side may be, for example, in the range approximately from 0.3 to 100 μm. And the thickness $T_{WG}$ (in Z-axis direction) of a portion on the rear-end surface 352 side may be, for example, in the range approximately from 0.1 to 4 μm, and the height (length) $H_{WG}$ (in X-axis direction) may be, for example, in the range approximately from 10 to 300 μm.

Further, the side surfaces of the waveguide 35: the upper surface 354; the lower surface 353; and both the side surfaces 351 in the track width direction (Y-axis direction) have a contact with the overcoat layer 38 (FIG. 2), that is, the insulating layers 383 and 384 (FIG. 3), except the portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the wavelength $\lambda_L$ of laser light is 600 nm and the overcoat layer 38 is formed of SiO$_2$ (silicon dioxide: n=1.5), the waveguide 35 can be formed of, for example, Al$_2$O$_3$ (alumina: n=1.63). Further, in the case that the overcoat layer 38 is formed of Al$_2$O$_3$ (n=1.63), the waveguide 35 can be formed of, for example, SiO$_X$N$_Y$ (n=1.7-1.85), Ta$_2$O$_5$ (n=2.16), Nb$_2$O$_5$ (n=2.33), TiO (n=2.3-2.55) or TiO$_2$ (n=2.3-2.55). This material structure of the waveguide 35 enables the propagation loss of waveguide light 53 to be reduced due to the excellent optical characteristics of the constituent material. Further, the existence of the waveguide 35 as a core and the overcoat layer 38 as a clad can provide total reflection conditions in all the side surfaces. As a result, more amount of waveguide light 53 can reach the position of the buffering portion 50, which improves the propagation efficiency of the waveguide 35. Meanwhile, in the present embodiment, a portion of propagation edge 360 that is not opposed to the waveguide 35 (buffering portion 50) may be covered with the constituent material of the overcoat layer 38 having refractive index $n_{OC}$, for example, with a portion 3840 of the insulating layer 384.

Further, alternatively, the waveguide 35 may have a multi-layered structure of dielectric materials in which the upper a layer is in the multilayered structure, the higher becomes the refractive index n of the layer. The multilayered structure can be realized, for example, by sequentially stacking dielectric materials of Si$_X$N$_Y$ with the composition ratios X and Y appropriately changed. The number of stacked layers may be, for example, in the range from 8 to 12. In the case that laser light 53 has a linear polarization in Z-axis direction, the above-described structure enables the laser light 53 to propagate in the position closer to the buffering portion 50. In this case, by choosing the composition and layer thickness in each layer, and the number of layers of the multilayered structure, the laser light 53 can propagate in the desired position in Z-axis direction.

The surface plasmon antenna 36 can have a width $W_{NF}$ in the track width direction (Y-axis direction) in the upper surface 361, the width $W_{NF}$ being sufficiently smaller than the wavelength of laser light 53, for example, of approximately 10 to 100 nm. And the surface plasmon antenna 36 can have a thickness $T_{NF1}$ (in Z-axis direction) sufficiently smaller than the wavelength of the laser light 53, for example, of approximately 10 to 100 nm. Further, the length (height) $H_{NF}$ (in X-axis direction) can be set to be, for example, in the range of, approximately 0.8 to 6.0 μm.

The buffering portion 50 is formed of a dielectric material having refractive index $n_{BF}$ lower than the refractive index $n_{WG}$ of the waveguide 35. For example, when the wavelength $\lambda_L$ of laser light is 600 nm and the waveguide 35 is formed of Al$_2$O$_3$ (alumina: n=1.63), the buffering portion 50 may be formed of SiO$_2$ (silicon dioxide: n=1.46). Further, when the waveguide 35 is formed of Ta$_2$O$_5$ (n=2.16), the buffering portion 50 may be formed of SiO$_2$ (n=1.46) or Al$_2$O$_3$ (n=1.63). In these cases, the buffering portion 50 can be a portion of the overcoat layer 38 (FIG. 2) that is made of SiO$_2$ (n=1.46) or Al$_2$O$_3$ (n=1.63) and serves as a clad. Further, the length $L_{BF}$ (in X-axis direction) of a portion of the buffering portion 50, the portion being sandwiched between the side surface 354 of the waveguide 35 and the propagation edge 360, is preferably in the range of 0.5 to 5 μm, and preferably larger than the wavelength $\lambda_L$ of the laser light 53. In this preferable case, the sandwiched portion has an area markedly larger than a so-called "focal region" in the case that laser light is, for example, converged on a buffering portion 50 and a surface plasmon antenna 36 and coupled in a surface plasmon mode. As a result, very stable coupling in the surface plasmon mode can be achieved. Further, the thickness $T_{BF}$ (in Z-axis direction) of the buffering portion 50 is preferably in the range of 10 to 200 nm. These length $L_{BF}$ and thickness $T_{BF}$ of the buffering portion 50 are important parameters adjusted for realizing appropriate excitation and propagation of surface plasmon.

Also as shown in FIG. 4, a thermal conduction layer 51 is preferably provided on the head part end surface 2210 side between the surface plasmon antenna 36 and the first main pole portion 3400a. The thermal conduction layer 51 is formed of, for example, an insulating material such as AlN, SiC or DLC, which has a higher thermal conductivity compared with that of the overcoat layer 38 (FIG. 2). The arrangement of such a thermal conduction layer 51 allows a part of the heat generated during the emission of NF-light from the surface plasmon antenna 36 to get away to the main magnetic pole 3400 and the main pole body 3401 through the thermal conduction layer 51. That is, the main magnetic pole 3400 and the main pole body 3401 can be utilized as a heatsink. As a result, excessive temperature rise of the surface plasmon antenna 36 can be suppressed, and there can be avoided unwanted protrusion of the NFL-generating end surface 36a and substantial reduction in the light use efficiency of the surface plasmon antenna 36.

The thickness $T_{TC}$ of the thermal conduction layer 51 is equivalent to a distance $D_{N-P}$ (FIG. 5), on the head part end surface 2210, between the NFL-generating end surface 36a and the end surface 3400e of the main magnetic pole 3400, and is set to be a small value of 100 nm or less. Further, the refractive index $n_{IN}$ of the thermal conduction layer 51 is set equal to or lower than the refractive index $n_{BF}$ of the buffering portion 50 that covers the propagation edge 360 of the surface plasmon antenna 36. That is, the propagation edge 360 of the surface plasmon antenna 36 is covered with a material having refractive index $n_{BF}$ equal to or higher than the refractive index $n_{IN}$ of a material covering the end surface 361 opposite to the edge 360 of the surface plasmon antenna 36. This allows surface plasmon to propagate stably on the propagation edge 360.

Also according to FIG. 4, the main magnetic pole layer 340 includes, as described-above, the main magnetic pole 3400 and the main pole body 3401. The main magnetic pole 3400 includes; the first main pole portion 3400a having the end surface 3400e reaching the head part end surface 2210; and the second main pole portion 3400b, the end portion on the head part end surface 2210 side of the portion 3400b being overlapped on a portion of the first main pole portion 3400a on the side opposite to the end surface 2210. Further, the end portion of the main pole body 3401 on the head part end surface 2210 side is overlapped on a portion of the second main pole portion 3400b on the side opposite to the end surface 2210. Namely, the end portion of the main magnetic pole layer 340 on the head part end surface 2210 side is formed in such a way as to become closer to the NFL-generating end surface 36a of the surface plasmon antenna 36 as going toward the head part end surface 2210. As a result, the end surface 3400e of the main magnetic pole layer 340 can be made sufficiently close to the NFL-generating end surface

36a, under the condition that the main magnetic pole layer 340 is sufficiently separated apart from the waveguide 35.

FIG. 5 shows a perspective view illustrating the shapes of the end surfaces of the waveguide 35, the surface plasmon antenna 36 and the electromagnetic transducer 34 on the head part end surface 2210 or in its vicinity. The front face of the figure is the head part end surface 2210.

As shown in FIG. 5, the main magnetic pole 3400 (the first main pole portion 3400a) and the write shield layer 345 (the trailing shield 3450) of the electromagnetic transducer 34 reach the head part end surface 2210. The shape of the end surface 3400e of the main magnetic pole 3400 on the head part end surface 2210 is, for example, a rectangle, a square or a trapezoid. Here, the above-described width $W_P$ is a length of the edge extending in the track width direction (Y-axis direction) of the end surface 3400e of the main magnetic pole 3400, and provides the width of a track formed on the magnetic recording layer of the magnetic disk in the case of magnetic-field-dominant recording. The width $W_P$ can be, for example, in the range of approximately 0.05 to 0.5 μm.

Moreover, on the head part end surface 2210, the NFL-generating end surface 36a of the surface plasmon antenna 36 is positioned close to the end surface 3400e of the main magnetic pole 3400 and in the leading side (−Z direction side) of the end surface 3400e. Here, a distance $D_{N-P}$ between the NFL-generating end surface 36a and the end surface 3400e is preferably set to be a sufficiently small value of, for example, 100 nm or less. In the thermally-assisted magnetic recording according to the present invention, the NFL-generating end surface 36a functions as a main heating action part, and the end surface 3400e functions as a writing action part. Therefore, by setting the distance $D_{N-P}$ in the above-described way, write field with sufficiently large gradient can be applied to a portion of the magnetic recording layer of the magnetic disk, the portion having been sufficiently heated. This enables a stable thermally-assisted write operation to be securely achieved.

Furthermore, in the present embodiment, the NFL-generating end surface 36a has a shape of isosceles triangle on the head part end surface 2210, having a bottom edge 361a on the trailing side (+Z side) and an apex on the leading side (−Z side) that is an end 360a of the propagation edge 360. The height $T_{NF2}$ of the NFL-generating end surface 36a is preferably 30 nm or less, and more preferably 20 nm or less. By setting the preferable height $T_{NF2}$, the NF-light emitting position on the end surface 36a can become close to the edge 361a on the trailing side, that is, closer to the end surface 3400e of the main magnetic pole 3400. Further, the apex angle $\theta_{NF}$ of apex 360a of the isosceles triangle is preferably in the range of 60 to 130 degrees.

As shown in FIG. 5, the NFL-generating end surface 36a is a portion of the head part end surface 2210, and may be a polished surface formed together with the end surface 2210 by a polishing. Actually, in the forming process of the surface plasmon antenna 36, first the whole body including the propagation edge 360 is shaped; then, the NFL-generating end surface 36a is formed by an MR height polishing process that determines the head part end surface 2210. Here, the surface plasmon antenna 36 is formed of a specific alloy with Ag as a main component. Therefore, there can be obtained the propagation edge 360 in which the generation of defects such as cracking and chipping is sufficiently suppressed.

Further, by using the configuration according to the present invention as shown in FIG. 4, a distance $D_{W-P}$ between the waveguide 35 and the main magnetic pole 3400 can be made sufficiently large while the distance $D_{N-P}$ is set to a minute value as described above. That is, the waveguide 35 can be sufficiently separated apart from the main magnetic pole 3400 and the main pole body 3401. As a result, there can be avoided such a situation in which a part of the laser light is absorbed into the main magnetic pole 3400 or the main pole body 3401 made of metal and the amount of light to be converted into NF-light is reduced.

Figure 6A:
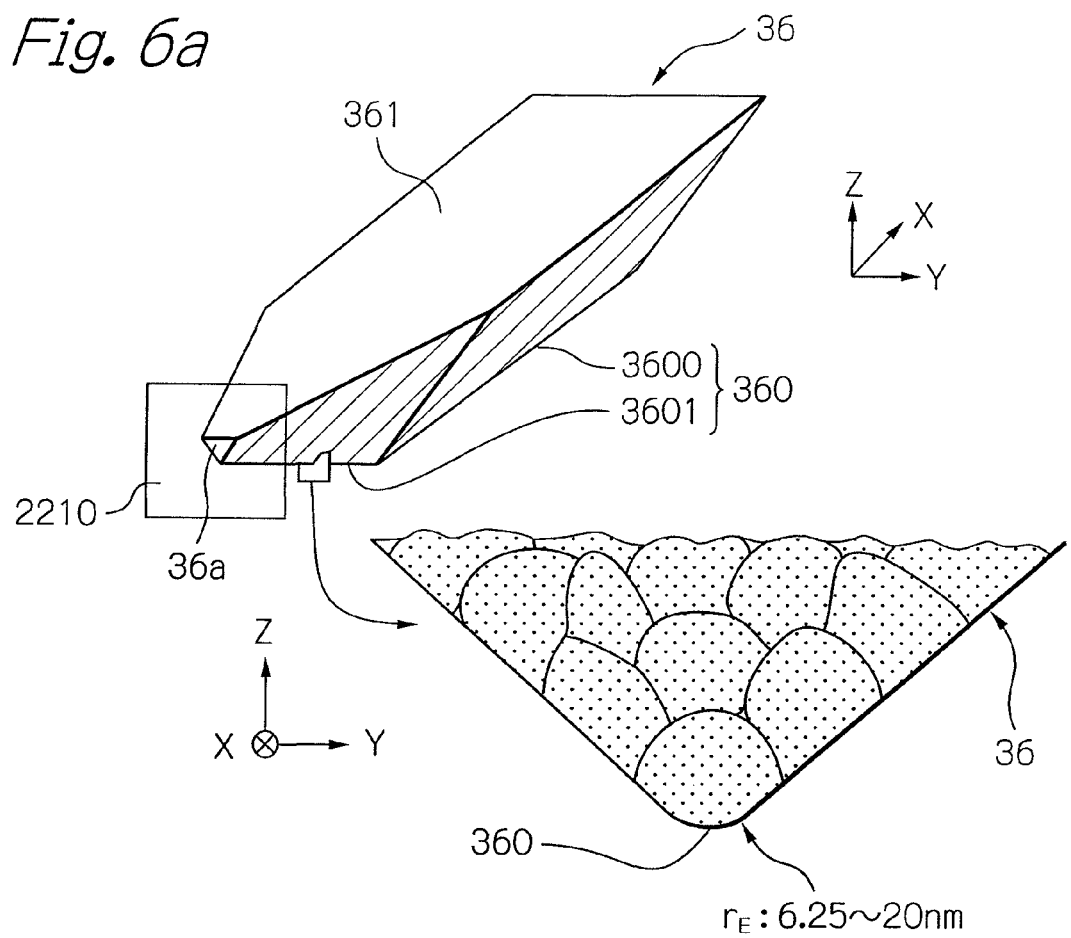
FIG. 6a shows a schematic view illustrating a state of crystal grains constituting the surface plasmon antenna according to the present invention.
Figure 6B:
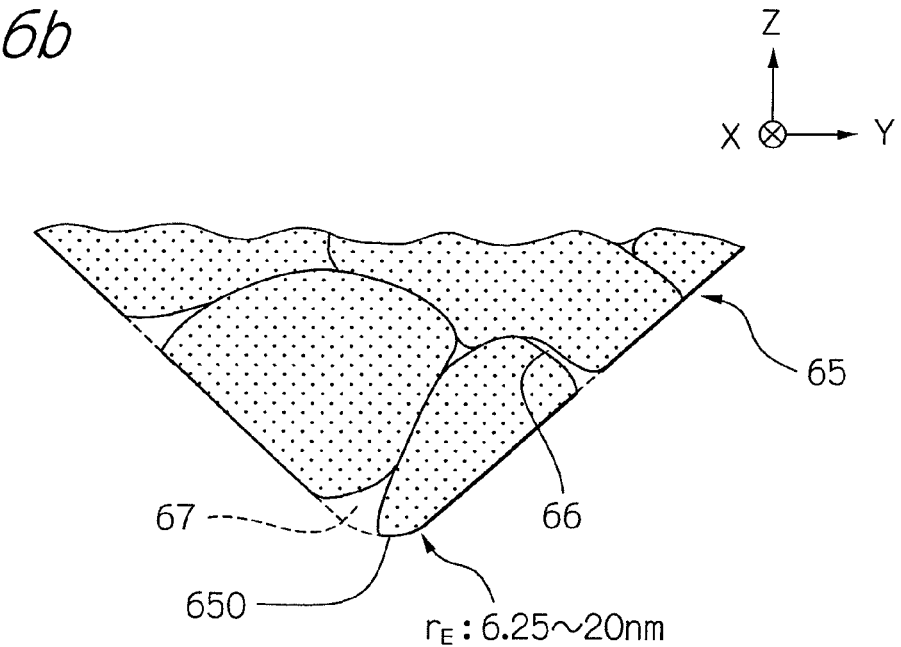
FIG. 6b shows a schematic view illustrating a comparative example of the state of crystal grains of a surface plasmon antenna.
Figure 6C:
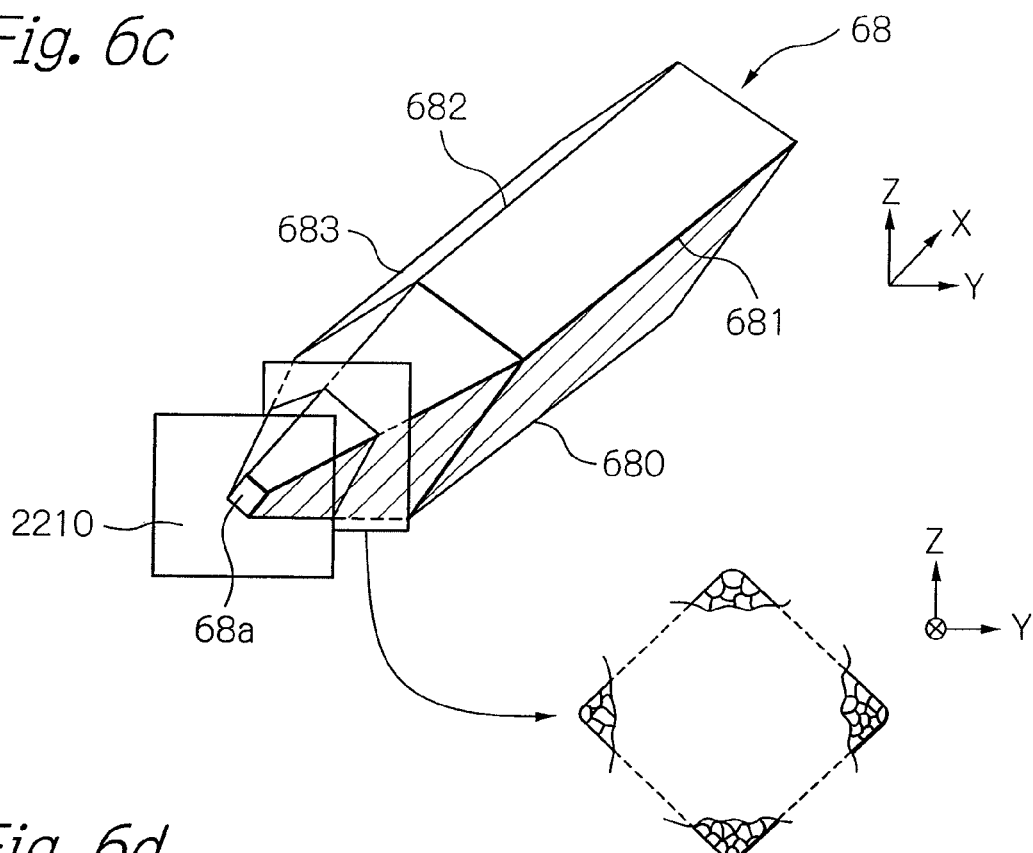
FIG. 6c shows a schematic view illustrating another embodiment of the surface plasmon antenna according to the present invention.
Figure 6D:
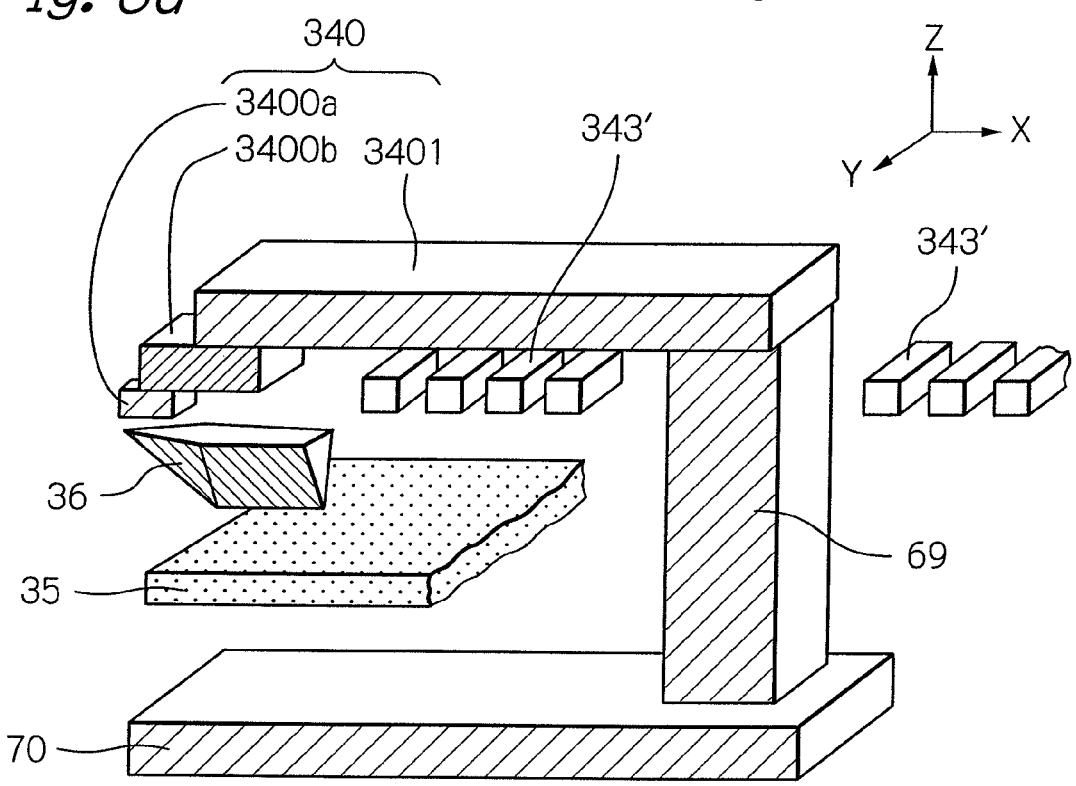
FIG. 6d shows a schematic view illustrating another embodiment of the shapes and configuration of the NFL-generating optical system and the electromagnetic transducer in the thermally-assisted magnetic recording head according to the present invention.

FIG. 6a shows a schematic view illustrating a state of crystal grains constituting the surface plasmon antenna 36 according to the present invention. FIG. 6b shows a schematic view illustrating a comparative example of the state of crystal grains of a surface plasmon antenna. The figures of the states of crystal grains shown in FIGS. 6a and 6b are cross-sections taken by YZ plane. Further, FIG. 6c shows a schematic view illustrating another embodiment of the surface plasmon antenna according to the present invention. Further, FIG. 6d shows a schematic view illustrating another embodiment of the shapes and configuration of the NFL-generating optical system and the electromagnetic transducer in the thermally-assisted magnetic recording head according to the present invention.

As shown in FIG. 6a, the surface plasmon antenna 36 shown in FIG. 4 has a shape of blade. Here, the propagation edge 360, which corresponds to the blade edge, includes: a portion 3600 parallel to the upper surface 361 that is the end surface opposite to propagation edge 360; and a portion 3601 that extends toward the NFL-generating end surface 36a in such a way as to become closer to the upper surface 361 and reaches the end surface 36a (the end surface 2210). Further, the cross-section taken by YZ plane (a plane parallel to the end surface 2210) has a shape of isosceles triangle in which an apex is a point included on the propagation edge 360. Thus, the NFL-generating end surface 36a also has a shape of isosceles triangle.

The propagation edge 360 is made rounded to prevent surface plasmon 60 from running off from the edge 360 and thus to avoid the decrease in light use efficiency. The curvature radius $r_E$ of the rounded edge is set to be in the range of 6.25 to 20 nm, thus the condition of the edge is appropriately controlled.

Further, the surface plasmon antenna 36 is formed of an alloy with silver (Ag) as a main component. The alloy preferably contains at least one element selected from a group of Pd, Au, Cu, Ru, Rh and Ir. Each of these elements easily makes a solid solution with Ag in low concentration, thus the addition of the element into Ag suppresses the volume expansion of Ag crystal grain, thereby effects a smaller diameter of the crystal grain. Furthermore, the Ag alloy is more preferably a Ag—Pd alloy with Pd concentration of 0.1 to 7.5 at % (atomic percent), a Ag—Au alloy with Au concentration of 0.1 to 5 at %, a Ag—Cu alloy with Cu concentration of 0.15 to 8 at %, a Ag—Ru alloy with Ru concentration of 0.15 to 5 at %, a Ag—Rh alloy with Rh concentration of 0.2 to 5.5 at %, or a Ag—Ir alloy with Ir concentration of 0.2 to 8 at %. The surface plasmon antenna 36 formed of the above-described Ag alloy can achieve a high efficiency of generating NF-light, which is the highest efficiency next to that for the case of Ag, as will be explained later with reference to practical examples. Here, Ag theoretically leads to the highest efficiency of generating NF-light. Then, each of the Ag alloys with the above-described concentrations of added elements leads to an efficiency of generating NF-light, which is the same as or higher than that for the case of Au, as will be also explained later with reference to practical examples. Here, Au theoretically leads to the second highest efficiency of generating NF-light in a single element. For reference, crystal grains of Ag—Pd alloy, Ag—Au alloy and Ag—Cu alloy are disclosed, for example, in U.S. Pat. No. 5,785,897.

The surface plasmon antenna 36 formed of any Ag alloy described above is stably constituted of crystal grains with a radius of the grains (a half of grain diameter) 20 nm or less. As a result, in a cross-section taken by YZ plane as shown in FIG. 6a, there can reliably be realized a condition in which a single crystal grain occupies a corner with a minute curvature radius $r_E$ in the above-described range. Thereby, even after a polishing in the manufacturing process, sufficiently suppressed is the generation of defects such as cracking and chipping in the propagation edge 360 and its vicinity, as will be explained later with reference to practical examples. Thus, there are improved a propagation efficiency of surface plasmon propagating on the propagation edge 360, and further a light use efficiency of the surface plasmon antenna 36. Moreover, the crystal structure of the above-described surface plasmon antenna 36 contributes to the improvement of process yield in head manufacturing.

On the contrary, as shown in FIG. 6b, a case in which the radii of constituting crystal grains are not controlled to be 20 nm or less will be explained hereinafter in a surface plasmon antenna 65 having a propagation edge 650 with a minute curvature radius $r_E$ in the above-described range. In the case, the vicinity of the propagation edge 650 is not necessarily occupied by a single crystal grain. In particular, when a boundary of crystal grains is positioned adjacent to the propagation edge 650, it is possible that voids are generated from the beginning of the formation of the propagation edge 650, or that defects such as cracking 66 or chipping 67 occur during the polishing process for forming the NFL-generating end surface. For example, in the case of forming a surface plasmon antenna of a single Ag, crystal grains with a variety of radii in the range of 20 to 50 nm are observed within the surface plasmon antenna. The various radii of crystal grains especially has a tendency to cause some defects to be generated adjacent to the propagation edge during the forming process of the surface plasmon antenna, which may cause the degradation of process yield in head manufacturing.

As shown in FIG. 6c, the surface plasmon antenna 68 has a polygon-shaped (quadrangle-shaped in the present embodiment) cross-section taken by YZ plane. It is possible that any edges 680, 681, 682 and 683 of the surface plasmon antenna 68 become a propagation edge on which excited surface plasmon propagates, depending on the positional relation between the antenna 68 and the waveguide and buffering portion. Further, the curvature radii of these edges are set to be in the range of 6.25 to 20 nm for the purpose of satisfactory propagation of surface plasmon. Moreover, the surface plasmon antenna 68 is formed of the same Ag alloy as that of which the surface plasmon antenna 36 shown in FIG. 6a is formed. As a result, in a cross-section taken by YZ plane as shown in FIG. 6c, there can reliably be realized a condition in which a single crystal grain occupies a corner of each of the edges 680, 681, 682 and 683. Thereby, even after a polishing in the manufacturing process, sufficiently suppressed is the generation of defects such as cracking and chipping in the edge and its vicinity.

In the embodiment shown in FIG. 6d, the configuration of a waveguide 35, a surface plasmon antenna 36 and a main magnetic pole layer 340 is the same as that shown in FIGS. 3 and 4. However, a write shield layer 70, which is a return yoke for receiving a magnetic flux returned from the magnetic disk, is provided on the side opposite to the main magnetic pole layer 340 in relation to the waveguide 35 and surface plasmon antenna 36, that is, on the leading side (in −Z side) from the waveguide 35 and surface plasmon antenna 36. The write shield layer 70 and the main magnetic pole layer 340 are magnetically connected with each other through a back contact portion 69. Further, a write coil layer 343' is formed in such a way as to pass through in one turn at least between the main magnetic pole layer 340 and the write shield layer 70, and has a spiral structure with the back contact portion 69 as a center. Also in this embodiment, by forming the surface plasmon antenna 36 of the above-described Ag alloy, there is improved the light use efficiency of the surface plasmon antenna 36, thereby a favorable thermally-assisted magnetic recording can be performed with use of a surface plasmon antenna according to the present invention.

FIGS. 7a1 to 7d2 show top views and cross-sectional views illustrating one embodiment of the method for forming the surface plasmon antenna 36 according to the present invention. Here, FIGS. 7a1, 7b1, 7c1 and 7d1 are top views figured when looking down to the element-formation surface of the substrate. And FIGS. 7a2, 7b2 and 7c2 are cross-sectional views taken along lines B-B, C-C and D-D in FIGS. 7a1, 7b1 and 7c1, respectively. Further, FIG. 7d2 is a schematic view illustrating the NFL-generating end surface 36a on the head part end surface 2210 formed by polishing.

First, as shown in FIGS. 7a1 and 7a2, after an insulating layer made of, for example, $Al_2O_3$ (alumina) is deposited on the waveguide 35, a cavity 500 with V-shaped cross-section is formed in the insulating layer by using, for example, a photolithography method and a reactive ion etching (RIE) method. Here, the insulating layer with the cavity constitutes a buffering portion 50. In the formation of the cavity 50, the shape of the used resist mask pattern and the RIE condition are adjusted so that the curvature radius of the corner of the valley bottom 501 of the cavity 500 is set to be in the range of 6.25 to 20 nm.

Then, as shown in FIGS. 7b1 and 7b2, after removing the mask pattern, a Ag alloy film 71 is stacked by using, for example, a sputtering method so that the formed cavity 500 is filled with the Ag alloy. The Ag alloy is an alloy with Ag as a main component and preferably contains at least one element selected from a group of Pd, Au, Cu, Ru, Rh and Ir. By using the Ag alloy as a constituent material, the crystal grains constituting the Ag alloy film 71 is controlled to have radii in the range of 20 nm or less. As a result, the valley bottom 501 of the cavity 500 is occupied by a single crystal grain. Thus, there can sufficiently be avoided the generation of voids due to the grain boundary positioned at the valley bottom 501 and its vicinity.

After that, by polishing the upper surface of the formed Ag alloy film with use of, for example, a chemical mechanical polishing (CMP) method, a surface plasmon antenna 36' with its upper surface planarized is formed as shown in FIGS. 7c1 and 7c2. Then, as shown in FIGS. 7d1 and 7d2, by performing an MR height process, which is a polishing process to determine a head part end surface 2210 and the height (length in X-axis direction) of the MR multilayer 332, the formation of the surface plasmon antenna 36 with the NFL-generating end surface 36a is completed. Here, the surface plasmon antenna 36 is constituted of crystal grains of the Ag alloy in which the grains are controlled to have radii in the range of 20 nm or less as described above and are strongly combined. As a result, during the polishing of the MR height process, the generation of defects such as cracking and chipping is sufficiently suppressed in the propagation edge 360 and its vicinity, especially in the edge 360 adjacent to the end surface 36a.

By using the above-described forming method, there can be realized a surface plasmon antenna 36 with a propagation edge 360 in which the condition of the edge is appropriately controlled and thus the generation of defects is sufficiently suppressed.

Hereinafter, the preferable ranges of concentrations of added elements in Ag alloy that constitutes the surface plasmon antenna according to the present invention will be explained with use of practical examples.

(Curvature Radius of the Rounded Propagation Edge)

First, the preferable range of curvature radius for the rounded propagation edge 360 of the surface plasmon antenna 36 will be explained with use of practical examples.

The practical examples correspond to simulation experiments in which a magnetic recording layer is heated with NF-light emitted from the NFL-generating end surface 36a of the surface plasmon antenna 36 with the propagation edge 360 shown in FIG. 4. In the simulation experiments, there was examined the dependence of the generated NF-light on curvature radius $r_E$ of the propagation edge 360. The length $H_{NF}$ (in X-axis direction) of the surface plasmon antenna 36 was 1.0 μm, the length $L_{BF}$ (in X-axis direction) of a portion opposed to the buffering portion 50 was 0.8 μm, and the apex angle $\theta_{NF}$ of the apex 360a in the NFL-generating end surface 36a was 110° (degrees). A portion to be heated of the magnetic recording layer was a rectangular-parallelepiped region having a length of 10 nm, a width of 100 nm and a thickness of 20 nm. In the actual thermally-assisted magnetic recording, it is known that the region is required to be heated from room temperature to 300° C. or more in 0.5 ns (nanosecond). From the fact, by examining a required intensity of electric field in the irradiating NF-light with use of simulation, the required intensity of electric field has been found out to be 1.0 $(V/m)^2$ or more.

FIG. 8 shows a graph illustrating the relation between the curvature radius $r_E$ of the propagation edge 360 and the intensity of electric field of the NF-light with which the magnetic recording layer is irradiated.

As shown in FIG. 8, the intensity of electric field of the NF-light emitted from the NFL-generating end surface 36a of the surface plasmon antenna 36 is maximized at about 15 nm of the curvature radius $r_E$ of the propagation edge 360. The intensity monotonically increases and decreases before and after the maximizing value of the curvature radius $r_E$, respectively. Thus, from the result that the electric-field intensity strongly depends on the curvature radius $r_E$, it is understood that, for a satisfactory thermally-assisted magnetic recording, it is crucial to control the curvature radius $r_E$. Here, it is found out that the curvature radius $r_E$ in the range from 6.25 nm to 20 nm effects the electric-field intensity of 1.0 $(V/m)^2$ or more which is required in order to perform the thermally-assisted magnetic recording.

As explained above with reference to FIG. 6a, in the propagation edge 360 with such a minute curvature radius $r_E$, it is significantly important to stably control the crystal grains constituting the surface plasmon antenna 36 to have radii of 20 nm or less. By the control, there can be realized a state in which the edge with the minute curvature radius $r_E$ in the above-described range is occupied by a single crystal grain in a cross-section taken by YZ plane near the propagation edge 360. Hereinafter, showing practical examples in which surface plasmon antennas 36 are formed of various Ag alloys, the preferable ranges of concentrations of added elements will be explained.

(Ag—Pd Alloy and Ag—Au Alloy)

Figure 9A:
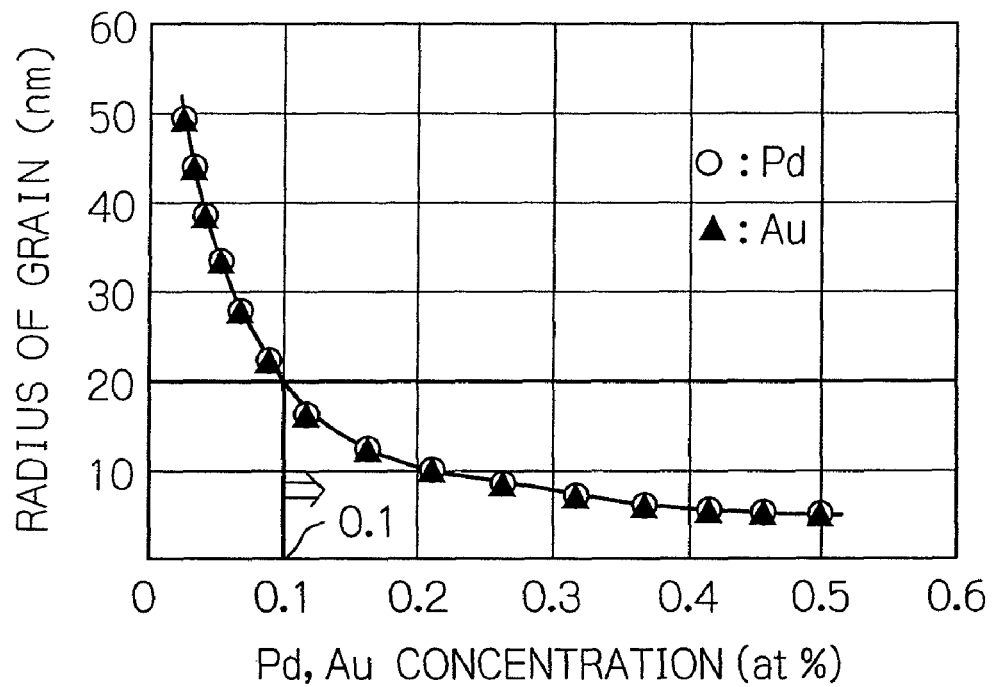
FIG. 9a shows a graph illustrating the relation between the additive concentration of Pd or Au and the radius of crystal grains constituting each of Ag—Pd alloy and Ag—Au alloy.

FIG. 9a shows a graph illustrating the relation between the additive concentration of Pd or Au and the radius of crystal grains constituting each of Ag—Pd alloy and Ag—Au alloy. The Ag—Pd alloy and Ag—Au alloy used in the present practical examples were layers stacked by using a sputtering method, and each of these alloys constituted the surface plasmon antenna 36. The length $H_{NF}$ (in X-axis direction) of the surface plasmon antenna 36 was 1.0 μm, and the length $L_{BF}$ (in X-axis direction) of a portion opposed to the buffering portion 50 was 0.8 μm. Further, the curvature radius $r_E$ of the propagation edge 360 was 15 nm, and the apex angle $\theta_{NF}$ of the apex 360a in the NFL-generating end surface 36a was 110° (degrees). The condition of the sputtering was adjusted in such a way that the radius of crystal grains was made maximized. Further, the radius of crystal grains was actually measured with the observation by a transmission electron microscope (TEM).

According to FIG. 9a, the radius of crystal grains decreases as the additive concentration of Pd or Au increases. In the additive concentration range of 0.1 at % (atomic percent) or more, both of Ag—Pd alloy and Ag—Au alloy have crystal grains with radii of 20 nm or less. Here, the value of radius of crystal grains in the graph is an average one. However, from the result of TEM observation, it is found out that, in the additive concentration range of 0.1 at % or more, the radii of almost all the crystal grains of Ag—Pd alloy and Ag—Au alloy are reliably maintained in the range of 20 nm or less. Therefore, it is understood that both of the additive concentrations of Pd and Au are preferably in the range of 0.1 at % or more. Further, based on the result shown in FIG. 9a, the additive concentration is much preferably determined in such a way that the radius of crystal grains is substantially equal to the curvature radius $r_E$ of the propagation edge 360. This much preferable case can realize more reliably the state in which the corner of propagation edge 360 is occupied by a single crystal grain.

Figure 9B:
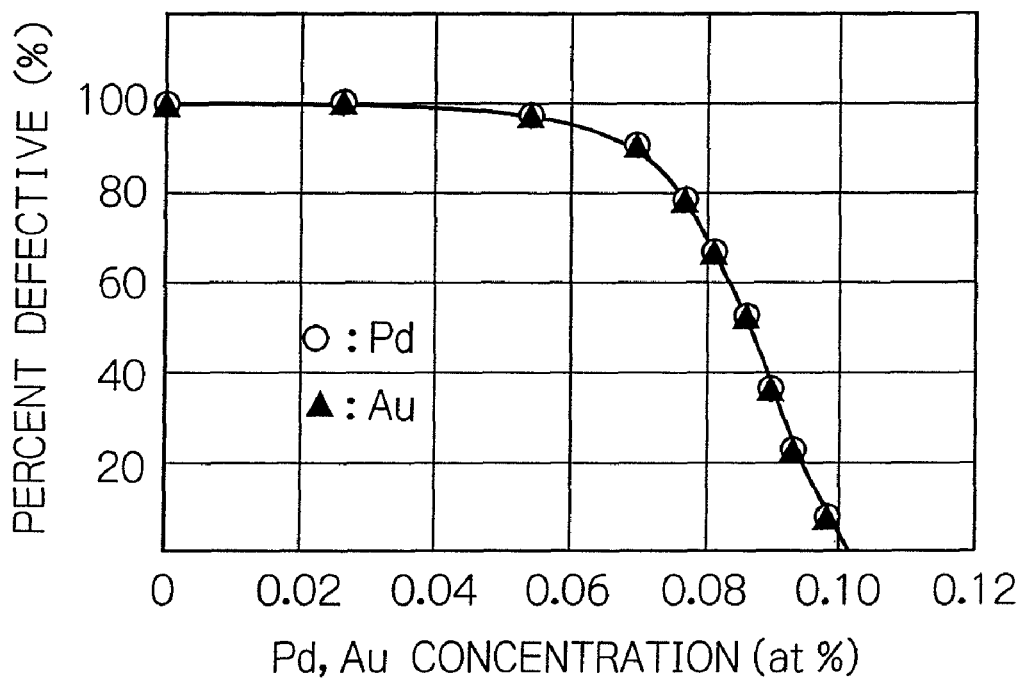

FIG. 9b shows a graph illustrating the relation between the additive concentration of Pd or Au and the percent defective of cracking or chipping, in the surface plasmon antenna 36 used in the practical examples shown in FIG. 9a. In the measurement of the percent defective of cracking or chipping, 100 samples of surface plasmon antennas 36 formed through the polishing for the MR height process were used. In each of the samples, the NFL-generating end surface 36a and its vicinity were observed by using a scanning electron microscope (SEM), then a sample in which even only one cracking or chipping was observed was judged as being a defective. Thus, the percent defective of cracking or chipping was defined as being the ratio of the number of defective samples to the whole 100 samples.

According to FIG. 9b, the percent defective of cracking or chipping decreases as the additive concentration of Pd or Au increases. When the additive concentration reaches 0.1 at %, the percent defective falls down to almost zero in each case of Ag—Pd alloy and Ag—Au alloy. This result is considered to be obtained exactly because the abrasion-proof characteristic is improved due to the minuteness of crystal grains and thus the stabilization of crystal structure in the propagation edge 360 and its vicinity, which sufficiently suppresses the generation of cracking and chipping. Therefore, it is understood that, in each case of Ag—Pd alloy and Ag—Au alloy, the abrasion-proof characteristic is excellently improved in the additive concentration range of 0.1 at % or more where the radius of crystal grains becomes 20 nm or less.

Figure 10:
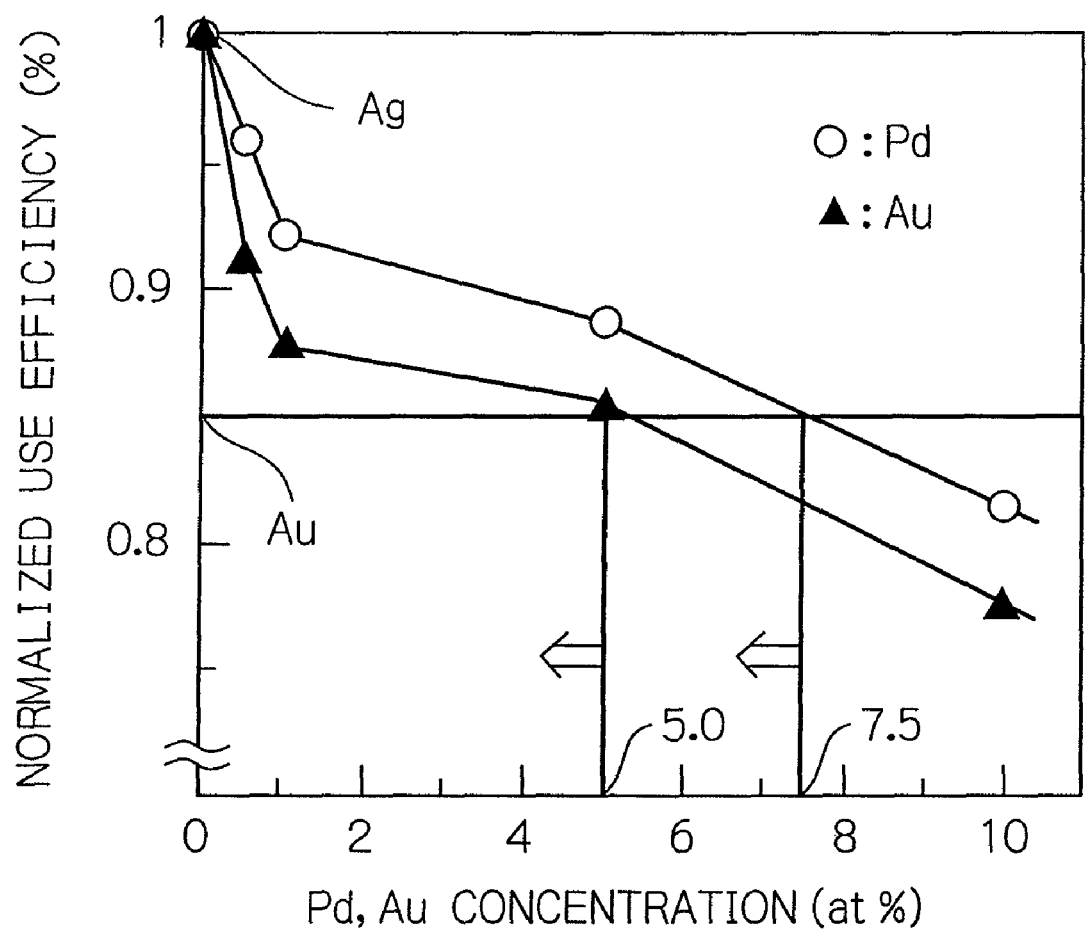
FIG. 10 shows a graph illustrating the relation between the additive concentration of Pd or Au in each of Ag—Pd alloy and Ag—Au alloy and the light use efficiency of the surface plasmon antenna formed of each of these alloys.

FIG. 10 shows a graph illustrating the relation between the additive concentration of Pd or Au in each of Ag—Pd alloy and Ag—Au alloy and the light use efficiency of the surface plasmon antenna 36 formed of each of these alloys. The light use efficiency was calculated by using the expression: $I_{OUT}/I_{IN}(\times 100)$ based on the result of simulation experiment. Here, $I_{IN}$ is the intensity of laser light that enters the waveguide 35, and $I_{OUT}$ is the intensity of NF-light emitted from the NFL-generating end, the NF-light being emitted after the entering laser light is converted into surface plasmon in the surface plasmon antenna 36. In the graph, the light use efficiency of vertical axis corresponds to a normalized value obtained by setting the light use efficiency of the surface plasmon antenna 36 formed of a single Ag to be a standard (that is, a value of 1).

As shown in FIG. 10, the light use efficiency decreases as the additive concentration of Pd or Au increases. Essentially, Ag, which is for the standard case, is a material that theoretically leads to the highest efficiency of generating HF-light. Therefore, the addition of another element inevitably causes the efficiency to be decreased. Here, the surface plasmon antenna 36 formed of a single Au, which theoretically leads to the second highest efficiency of generating NF-light in a single element, has a light use efficiency of 0.85. According to FIG. 10, 7.7 at % or less is the Pd concentration that leads to a light use efficiency of the value (0.85) in case of Au or more, and of the second highest value next to that in case of Ag. Further, 5.0 at % or less is the Au concentration that leads to a light use efficiency of the value (0.85) in case of Au or more, and of the second highest value next to that in case of Ag.

In conclusion, from the aspect of abrasion-proof characteristic and light use efficiency, it is understood that Ag—Pd alloy with Pd concentration in the range of 0.1 to 7.5 at % and Ag—Au alloy with Au concentration in the range of 0.1 to 5 at % are excellently preferable as a constituent material of the surface plasmon antenna 36.

(Ag—Cu Alloy and Ag—Ru Alloy)

Figure 11A:
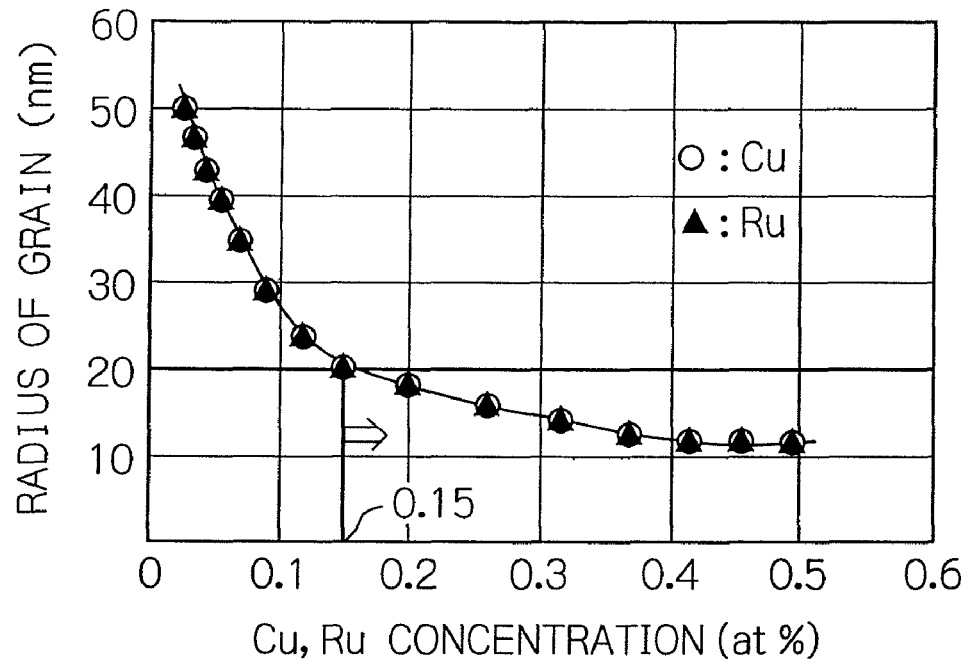
FIG. 11a shows a graph illustrating the relation between the additive concentration of Cu or Ru and the radius of crystal grains constituting each of Ag—Pd alloy and Ag—Au alloy.

FIG. 11a shows a graph illustrating the relation between the additive concentration of Cu or Ru and the radius of crystal grains constituting each of Ag—Pd alloy and Ag—Au alloy. The Ag—Cu alloy and Ag—Ru alloy used in the present practical examples were layers stacked by using a sputtering method, and each of these alloys constituted the surface plasmon antenna 36 that has the same shape and size as those of the practical examples shown in FIG. 9a. Further, the condition of the sputtering was adjusted in such a way that the radius of crystal grains was made maximized. Further, the radius of crystal grains was actually measured with the observation by a TEM.

According to FIG. 11a, the radius of crystal grains decreases as the additive concentration of Cu or Ru increases. In the additive concentration range of 0.15 at % or more, both of Ag—Cu alloy and Ag—Ru alloy have crystal grains with radii of 20 nm or less. Further, from the result of TEM observation, it is found out that, in the additive concentration range of 0.15 at % or more, the radii of almost all the crystal grains of Ag—Cu alloy and Ag—Ru alloy are reliably maintained in the range of 20 nm or less. Therefore, it is understood that both of the additive concentrations of Cu and Ru are preferably in the range of 0.15 at % or more. Further, based on the result shown in FIG. 11a, the additive concentration is much preferably determined in such a way that the radius of crystal grains is substantially equal to the curvature radius $r_E$ of the propagation edge 360. This much preferable case can realize more reliably the state in which the corner of propagation edge 360 is occupied by a single crystal grain.

Figure 11B:
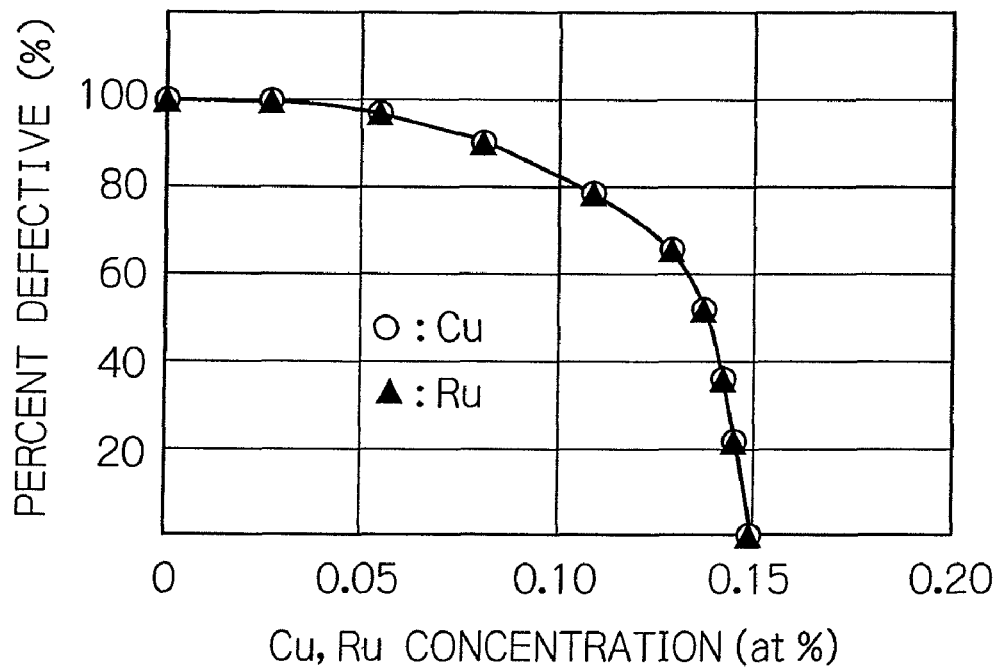

FIG. 11b shows a graph illustrating the relation between the additive concentration of Cu or Ru and the percent defective of cracking or chipping, in the surface plasmon antenna 36 used in the practical examples shown in FIG. 11a. The percent defective of cracking or chipping was measured in the same way as that in the practical examples shown in FIG. 9b.

According to FIG. 11b, the percent defective of cracking or chipping decreases as the additive concentration of Cu or Ru increases. When the additive concentration reaches 0.15 at %, the percent defective falls down to almost zero in each case of Ag—Cu alloy and Ag—Ru alloy. This result is considered to be obtained exactly because the abrasion-proof characteristic is improved due to the minuteness of crystal grains and thus the stabilization of crystal structure in the propagation edge 360 and its vicinity, which sufficiently suppresses the generation of cracking and chipping. Therefore, it is understood that, in each case of Ag—Cu alloy and Ag—Ru alloy, the abrasion-proof characteristic is excellently improved in the additive concentration range of 0.15 at % or more where the radius of crystal grains becomes 20 nm or less.

Figure 12:
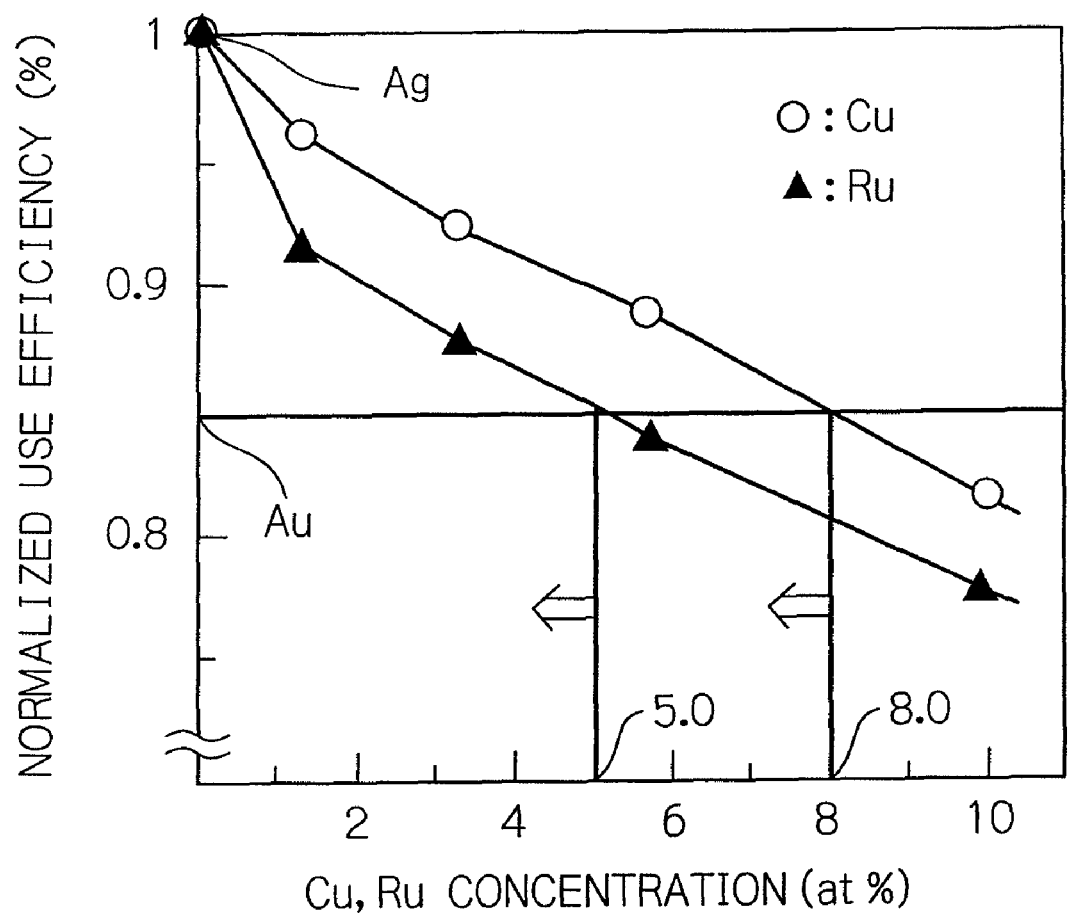
FIG. 12 shows a graph illustrating the relation between the additive concentration of Cu or Ru in each of Ag—Cu alloy and Ag—Ru alloy and the light use efficiency of the surface plasmon antenna formed of each of these alloys.

FIG. 12 shows a graph illustrating the relation between the additive concentration of Cu or Ru in each of Ag—Cu alloy and Ag—Ru alloy and the light use efficiency of the surface plasmon antenna 36 formed of each of these alloys. The light use efficiency was calculated by using the expression: $I_{OUT}/I_{IN}(\times 100)$ described above, based on the result of simulation experiment. Further, also in the graph, the light use efficiency of vertical axis corresponds to a normalized value obtained by setting the light use efficiency of the surface plasmon antenna 36 formed of a single Ag to be a standard (that is, a value of 1).

As shown in FIG. 12, the light use efficiency decreases as the additive concentration of Cu or Ru increases. According to the figure, 8.0 at % or less is the Cu concentration that leads to a light use efficiency of the value (0.85) in case of Au or more, and of the second highest value next to that in case of Ag. Further, 5.0 at % or less is the Ru concentration that leads to a light use efficiency of the value (0.85) in case of Au or more, and of the second highest value next to that in case of Ag.

In conclusion, from the aspect of abrasion-proof characteristic and light use efficiency, it is understood that Ag—Cu alloy with Cu concentration in the range of 0.15 to 8 at % and Ag—Ru alloy with Ru concentration in the range of 0.15 to 5 at % are excellently preferable as a constituent material of the surface plasmon antenna 36.

(Ag—Rh Alloy and Ag—Ir Alloy)

Figure 13A:
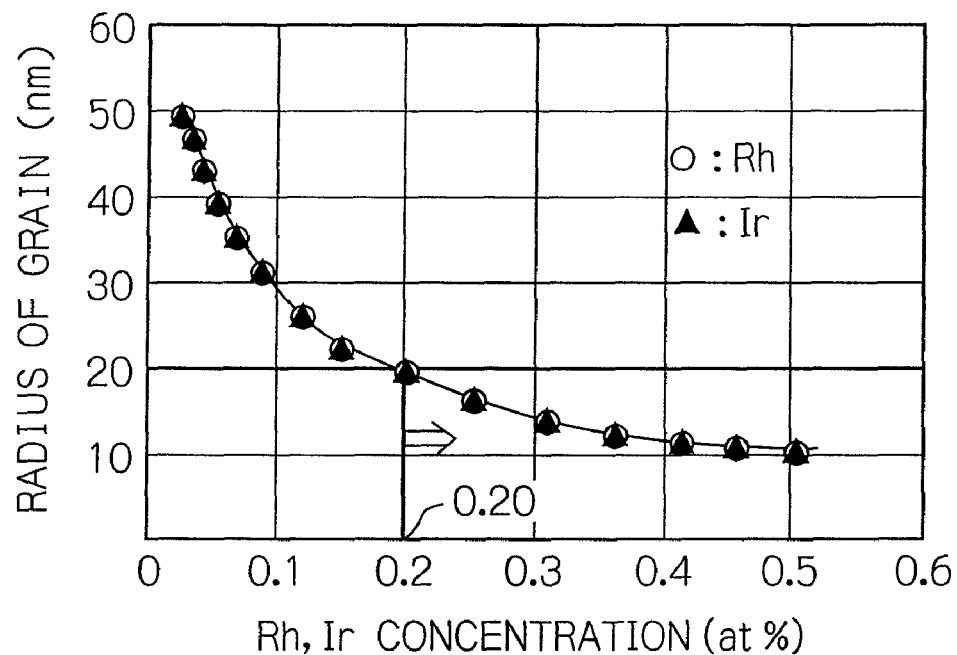
FIG. 13a shows a graph illustrating the relation between the additive concentration of Rh or Ir and the radius of crystal grains constituting each of Ag—Rh alloy and Ag—Ir alloy.

FIG. 13a shows a graph illustrating the relation between the additive concentration of Rh or Ir and the radius of crystal grains constituting each of Ag—Rh alloy and Ag—Ir alloy. The Ag—Rh alloy and Ag—Ir alloy used in the present practical examples were layers stacked by using a sputtering method, and each of these alloys constituted the surface plasmon antenna 36 that has the same shape and size as those of the practical examples shown in FIG. 9a. Further, the condition of the sputtering was adjusted in such a way that the radius of crystal grains was made maximized. Further, the radius of crystal grains was actually measured with the observation by a TEM.

According to FIG. 13a, the radius of crystal grains decreases as the additive concentration of Rh or Ir increases. In the additive concentration range of 0.2 at % or more, both of Ag—Rh alloy and Ag—Ir alloy have crystal grains with radii of 20 nm or less. Further, from the result of TEM observation, it is found out that, in the additive concentration range of 0.2 at % or more, the radii of almost all the crystal grains of Ag—Rh alloy and Ag-ir alloy are reliably maintained in the range of 20 nm or less. Therefore, it is understood that both of the additive concentrations of Rh and Ir are preferably in the range of 0.2 at % or more. Further, based on the result shown in FIG. 13a, the additive concentration is much preferably determined in such a way that the radius of crystal grains is substantially equal to the curvature radius $r_E$ of the propagation edge 360. This much preferable case can realize more reliably the state in which the corner of propagation edge 360 is occupied by a single crystal grain.

Figure 13B:
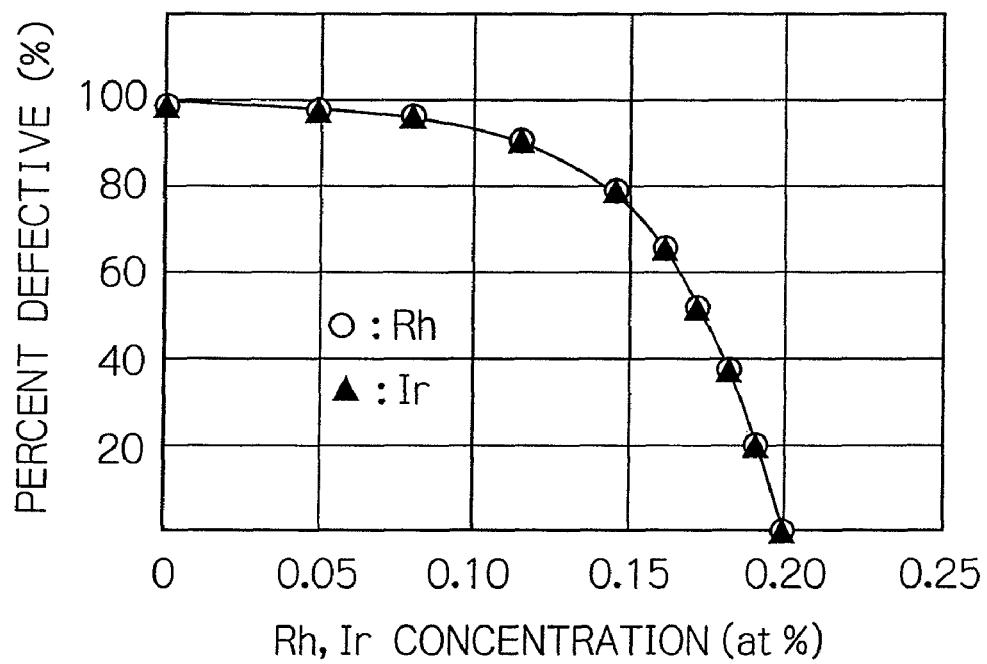

FIG. 13b shows a graph illustrating the relation between the additive concentration of Rh or Ir and the percent defective of cracking or chipping, in the surface plasmon antenna 36 used in the practical examples shown in FIG. 13a. The percent defective of cracking or chipping was measured in the same way as that in the practical examples shown in FIG. 9b.

According to FIG. 13b, the percent defective of cracking or chipping decreases as the additive concentration of Rh or Ir increases. When the additive concentration reaches 0.2 at %, the percent defective falls down to almost zero in each case of Ag—Rh alloy and Ag—Ir alloy. This result is considered to be obtained exactly because the abrasion-proof characteristic is improved due to the minuteness of crystal grains and thus the stabilization of crystal structure in the propagation edge 360 and its vicinity, which sufficiently suppresses the generation of cracking and chipping. Therefore, it is understood that, in each case of Ag—Rh alloy and Ag—Ir alloy, the abrasion-proof characteristic is excellently improved in the additive concentration range of 0.2 at % or more where the radius of crystal grains becomes 20 nm or less.

Figure 14:
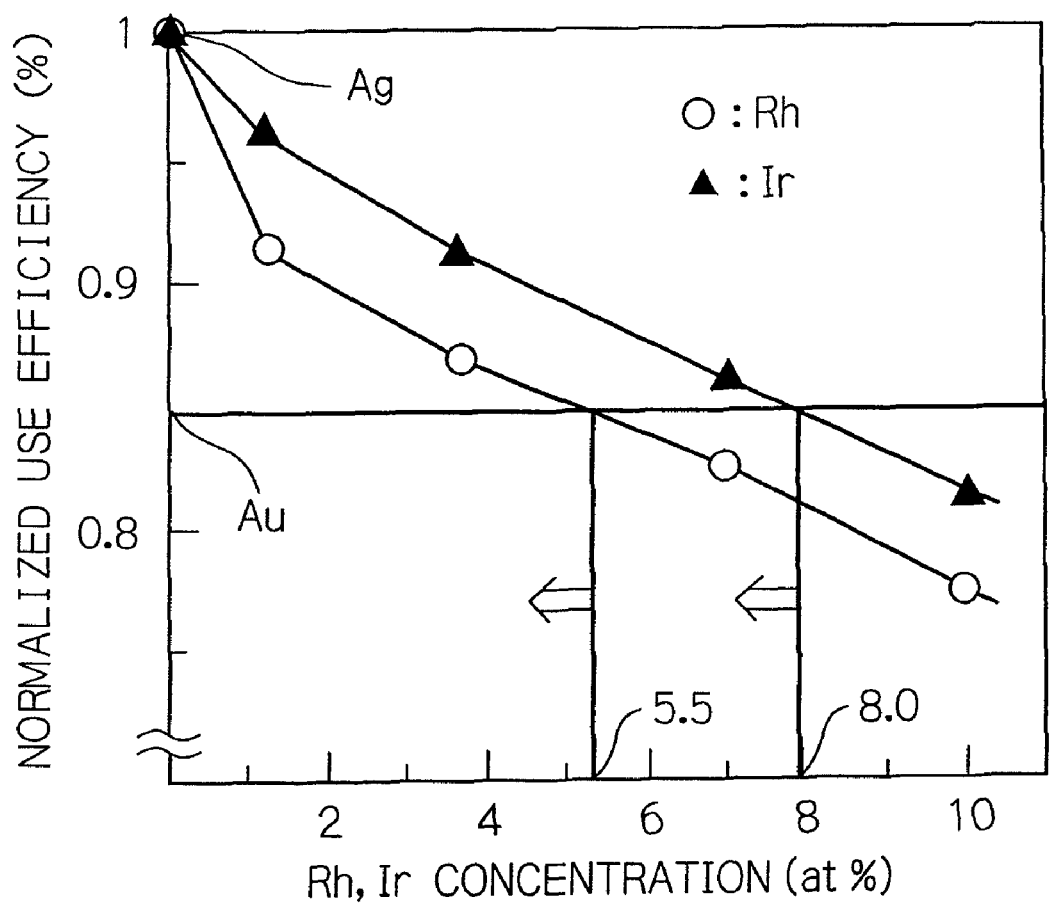
FIG. 14 shows a graph illustrating the relation between the additive concentration of Rh or Ir in each of Ag—Rh alloy and Ag—Ir alloy and the light use efficiency of the surface plasmon antenna formed of each of these alloys.

FIG. 14 shows a graph illustrating the relation between the additive concentration of Rh or Ir in each of Ag—Rh alloy and Ag—Ir alloy and the light use efficiency of the surface plasmon antenna 36 formed of each of these alloys. The light use efficiency was calculated by using the expression: $I_{OUT}/I_{IN}(\times 100)$ described above, based on the result of simulation experiment. Further, also in the graph, the light use efficiency of vertical axis corresponds to a normalized value obtained by setting the light use efficiency of the surface plasmon antenna 36 formed of a single Ag to be a standard (that is, a value of 1).

As shown in FIG. 14, the light use efficiency decreases as the additive concentration of Rh or Ir increases. According to the figure, 5.5 at % or less is the Rh concentration that leads to a light use efficiency of the value (0.85) in case of Au or more, and of the second highest value next to that in case of Ag. Further, 8.0 at % or less is the Ir concentration that leads to a light use efficiency of the value (0.85) in case of Au or more, and of the second highest value next to that in case of Ag.

In conclusion, from the aspect of abrasion-proof characteristic and light use efficiency, it is understood that Ag—Rh alloy with Rh concentration in the range of 0.2 to 5.5 at % and Ag—Ir alloy with Ir concentration in the range of 0.2 to 8 at % are excellently preferable as a constituent material of the surface plasmon antenna 36.

As described above, it is understood that, according to the present invention, there can be realized a surface plasmon antenna with a propagation edge in which the curvature radius of the edge is appropriately controlled and the generation of defects such as cracking and chipping is sufficiently suppressed by using the special Ag alloy as a constituent material. This surface plasmon antenna has an excellently high abrasion-proof characteristic, and thus shows the second highest light use efficiency next to that in case of Ag. Furthermore, there can be provided a thermally-assisted magnetic recording head that includes the above-described surface plasmon antenna, and can perform a satisfactory thermally-assisted magnetic recording, and thereby can contribute to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Especially, the NF-light generator utilizing a surface plasmon mode according to the present invention can be applied to optical devices with greatly minute optical paths such as ultra-high-speed light modulation devices. Accordingly, the present invention is limited only as defined in the following claims and equivalents thereto.

The invention claimed is:

1. A near-field light transducer formed of a silver alloy and comprising an edge,
   the edge comprising a portion to be coupled with a light in a surface plasmon mode, extending from the portion to a near-field light generating end surface from which near-field light is emitted, and configured to propagate surface plasmon excited by the light, and
   a curvature radius of the edge that is rounded being 6.25 nanometers or more and being 20 nanometers or less, wherein the silver alloy is selected from a group of (a) a silver-palladium alloy having a concentration of palladium of 0.1 atomic percent or more, and 7.5 atomic percent or less, (b) a silver-gold alloy having a concentration of gold of 0.1 atomic percent or more, and 5 atomic percent or less, (c) a silver-copper alloy, having a concentration of copper of 0.15 atomic percent or more, and 8 atomic percent or less, (d) a silver-ruthenium alloy having a concentration of ruthenium of 0.15 atomic percent or more, and 5 atomic percent or less, (e) a silver-rhodium alloy having a concentration of rhodium of 0.2 atomic percent or more, and 5.5 atomic percent or less, and (f) a silver-iridium alloy having a concentration of iridium of 0.2 atomic percent or more, and 8 atomic percent or less.

2. The near-field light transducer as claimed in claim 1, wherein the near-field light generating end surface is a polished surface formed by a polishing.

3. The near-field light transducer as claimed in claim 1, wherein a radius of crystal grains constituting the silver alloy is 20 nanometers or less.

4. A near-field light generating optical system comprising a waveguide configured to propagate the light for exciting surface plasmon and a near-field light transducer as claimed in claim 1.

5. The near-field light generating optical system as claimed in claim 4, wherein further provided is a buffering portion that is sandwiched between a portion of one side surface of the waveguide and a portion of the edge and has a refractive index lower than a refractive index of the waveguide.

6. A thermally-assisted magnetic recording head comprising:
   a magnetic pole for generating write field from its end on an opposed-to-medium surface side;
   a waveguide configured to propagate a light for exciting surface plasmon; and
   a near-field light transducer formed of a silver alloy and comprising an edge,
   the edge comprising a portion to be coupled with the light in a surface plasmon mode, extending from the portion to a near-field light generating end surface that reaches the opposed-to-medium surface and emits near-field light, and configured to propagate surface plasmon excited by the light, and
   a curvature radius of the edge that is rounded being 6.25 nanometers or more and being 20 nanometers or less, wherein the silver alloy is selected from a group of (a) a silver-palladium alloy having a concentration of palladium of 0.1 atomic percent or more, and 7.5 atomic percent or less, (b) a silver-gold alloy having a concentration of gold of 0.1 atomic percent or more, and 5 atomic percent or less, (c) a silver-copper alloy, having a concentration of copper of 0.15 atomic percent or more, and 8 atomic percent or less, (d) a silver-ruthenium alloy having a concentration of ruthenium of 0.15 atomic percent or more, and 5 atomic percent or less, (e) a silver-rhodium alloy having a concentration of rhodium of 0.2 atomic percent or more, and 5.5 atomic percent or less, and (f) a silver-iridium alloy having a concentration of iridium of 0.2 atomic percent or more, and 8 atomic percent or less.

7. The thermally-assisted magnetic recording head as claimed in claim 6, wherein the waveguide is provided on a side opposite to the magnetic pole in relation to the near-field light transducer.

8. The thermally-assisted magnetic recording head as claimed in claim 6, wherein further provided is a buffering portion that is sandwiched between a portion of one side surface of the waveguide and a portion of the edge and has a refractive index lower than a refractive index of the waveguide.

9. The thermally-assisted magnetic recording head as claimed in claim 6, wherein the near-field light generating end surface is a portion of the opposed-to-medium surface formed by a polishing.

10. The thermally-assisted magnetic recording head as claimed in claim 6, wherein a light source is provided on a side of the head opposite to the opposed-to-medium surface, and an end surface of the waveguide on a light-receiving side reaches a head end surface on an opposite side to the opposed-to-medium surface and is positioned in such a way as to receive a light generated from the light source.

11. A head gimbal assembly comprising a thermally-assisted magnetic recording head as claimed in claim 6 and a suspension supporting the thermally-assisted magnetic recording head.

12. A magnetic recording apparatus comprising:
at least one head gimbal assembly comprising a thermally-assisted magnetic recording head and a suspension supporting the thermally-assisted magnetic recording head;
at least one magnetic recording medium; and
a recording circuit for controlling write operations which the thermally-assisted magnetic recording head performs to the at least one magnetic recording medium, the thermally-assisted magnetic recording head comprising:
a magnetic pole for generating write field from its end on the opposed-to-medium surface side;
a waveguide configured to propagate a light for exciting surface plasmon; and
a near-field light transducer formed of a silver alloy and comprising an edge,
the edge comprising a portion to be coupled with the light in a surface plasmon mode, extending from the portion to a near-field light generating end surface that reaches the opposed-to-medium surface and emits near-field light, and configured to propagate surface plasmon excited by the light,
a curvature radius of the edge that is rounded being 6.25 nanometers or more and being 20 nanometers or less, and
the recording circuit further comprising a light-emission control circuit for controlling operations of a light source that generates the light for exciting surface plasmon, wherein the silver alloy is selected from a group of (a) a silver-palladium alloy having a concentration of palladium of 0.1 atomic percent or more, and 7.5 atomic percent or less, (b) a silver-gold alloy having a concentration of gold of 0.1 atomic percent or more, and 5 atomic percent or less, (c) a silver-copper alloy, having a concentration of copper of 0.15 atomic percent or more, and 8 atomic percent or less, (d) a silver-ruthenium alloy having a concentration of ruthenium of 0.15 atomic percent or more, and 5 atomic percent or less, (e) a silver-rhodium alloy having a concentration of rhodium of 0.2 atomic percent or more, and 5.5 atomic percent or less and silver-iridium alloy having a concentration of iridium of 0.2 atomic percent or more, and 8 atomic percent or less.

* * * * *